(12) United States Patent
Rake et al.

(10) Patent No.: US 7,017,712 B1
(45) Date of Patent: Mar. 28, 2006

(54) APPARATUS AND METHOD FOR LUBRICANT CONDITION CONTROL AND MONITORING

(75) Inventors: Brad Rake, Hubertus, WI (US); Keith Cravillion, Brookfield, WI (US); Mark Moertl, Grafton, WI (US)

(73) Assignee: Trico Mfg. Corp., Pewaukee, WI (US)

( * ) Notice: Subject to any disclaimer, the term of this patent is extended or adjusted under 35 U.S.C. 154(b) by 0 days.

(21) Appl. No.: 09/457,026

(22) Filed: Dec. 8, 1999

Related U.S. Application Data

(63) Continuation-in-part of application No. 09/207,373, filed on Dec. 8, 1998, now abandoned, which is a continuation-in-part of application No. 08/820,124, filed on Mar. 19, 1997, now Pat. No. 5,878,842.

(60) Provisional application No. 60/085,643, filed on May 15, 1998.

(51) Int. Cl.
*F01M 9/00* (2006.01)
*F01M 1/18* (2006.01)
*G01N 19/02* (2006.01)

(52) U.S. Cl. ........................ 184/6.4; 184/6.1; 184/108; 73/10

(58) Field of Classification Search ................ 184/6.1, 184/6.4, 7.4, 37, 108, 27.1, 103.1, 103.2, 184/64, 6.14, 6.24; 384/462, 448; 73/10
See application file for complete search history.

(56) References Cited

U.S. PATENT DOCUMENTS

| | | | |
|---|---|---|---|
| 1,864,195 A * | 6/1932 | Hall ........................... | 184/27.1 |
| 3,952,566 A * | 4/1976 | Jacobson ...................... | 73/10 |
| 4,064,455 A * | 12/1977 | Hopkins et al. ............. | 324/663 |
| 4,312,424 A * | 1/1982 | Taylor et al. ................ | 184/6.4 |
| 4,445,168 A | 4/1984 | Petryszyn | |
| 4,527,661 A * | 7/1985 | Johnstone et al. ........... | 184/6.1 |
| 4,735,286 A * | 4/1988 | Miki et al. .................... | 184/64 |
| 4,738,336 A | 4/1988 | Smith et al. | |

(Continued)

OTHER PUBLICATIONS

Hydraulic and Lubrication Systems Solutions: Water Sensor- An essential tool for fluid condition monitoring Pall corporation sales literature, not dated.

*Primary Examiner*—Richard W. Ridley
*Assistant Examiner*—Colby Hansen
(74) *Attorney, Agent, or Firm*—Ryan Kromholz & Manion, S.C.

(57) ABSTRACT

A volumetric lubricant dispensing apparatus for delivering a precise volume of lubricant, such as oil, to a rotating machine element. The delivery mechanism includes a piston and cylinder assembly. A plurality of sensors are utilized to record operating conditions of the machine, element, environment, and lubricant. The apparatus is controlled either manually or with the aid of a controller unit such as a microprocessor. The output from each sensor is inputted into the microprocessor wherein an algorithm computes an responsive output. The responsive output is sent to the piston and cylinder assembly, which maintains an optimum lubricant condition within the reservoir wherein a rotating machine element located. Alternatively, for the purpose of qualitative control, the present invention may be described as a system intended for controlling lubricants, both mineral (natural) and synthetic based by measuring the condition characteristics of the lubricant. Some condition characteristics may include water or moisture content (the content could be any liquid, e.g., solvents like ketones are known to change condition characteristics like viscosity) and viscosity. Viscosity is related to temperature, therefore, temperature correlation to viscosity is helpful to provide relative indications for condition characteristics like lubricant flow.

9 Claims, 20 Drawing Sheets

U.S. PATENT DOCUMENTS

| | | | |
|---|---|---|---|
| 4,990,057 A * | 2/1991 | Rollins .................... 184/64 X |
| 5,060,760 A | 10/1991 | Long et al. |
| 5,080,195 A | 1/1992 | Mizumoto et al. |
| 5,125,480 A | 6/1992 | Gregory et al. |
| 5,203,680 A | 4/1993 | Waldrop |
| 5,224,051 A * | 6/1993 | Johnson ................. 184/6.14 X |
| 5,273,134 A * | 12/1993 | Hegemier et al. ........... 184/6.4 |
| 5,330,636 A * | 7/1994 | Reichert ................ 184/6.24 X |
| 5,332,064 A * | 7/1994 | Liu ........................... 184/6.4 |
| 5,381,874 A * | 1/1995 | Hadank et al. ............. 184/6.4 |
| 5,125,480 A | 4/1995 | Gregory et al. |
| 5,634,531 A * | 6/1997 | Graf et al. .............. 184/108 X |
| 5,671,825 A * | 9/1997 | Wong et al. ................. 184/6.4 |
| 5,702,592 A * | 12/1997 | Suri et al. ............... 184/108 X |
| 5,816,212 A * | 10/1998 | Lindquist et al. ...... 184/6.24 X |

* cited by examiner

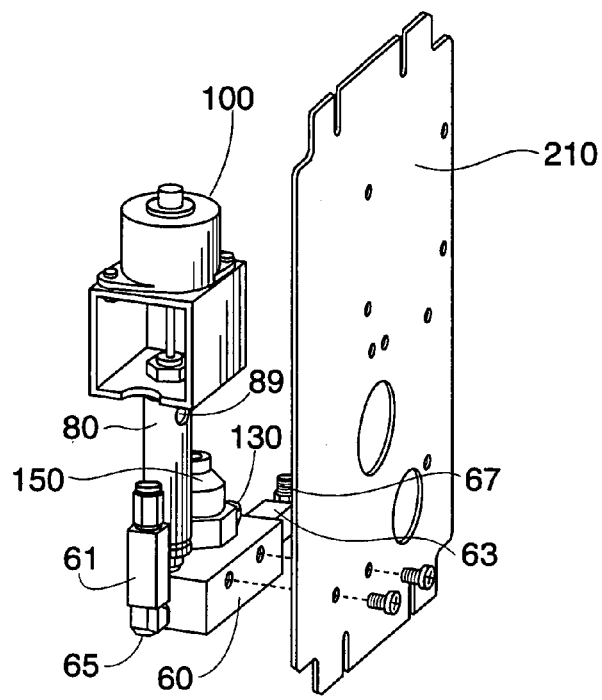
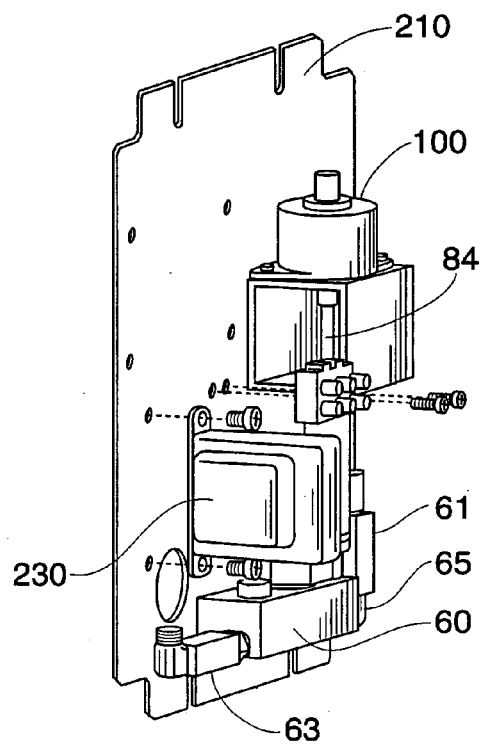
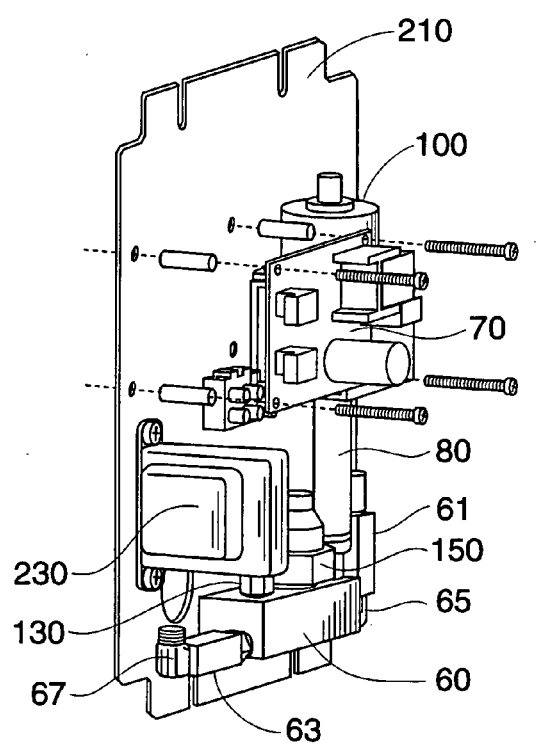
Fig. 15
Fig. 16
Fig. 17

APPARATUS AND METHOD FOR LUBRICANT CONDITION CONTROL AND MONITORING

This application claims the benefit of and is a continuation-in-part of application Ser. No. 09/207,373 filed on 8 Dec. 1998, which application is now abandoned, which is a cip and also claims the benefit of application Ser. No. 08/820,124 filed Mar. 19, 1997 (U.S. Pat. No. 5,878,842) and application 60/085,643 filed May 15, 1998.

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

The present invention relates to an apparatus for supplying an optimum amount of lubricant to a machine element in order to achieve peak lubrication. Prior art lubricators, such as the TRICO OptoMatic oiler, supply a constant level of lubricant within a lubricant reservoir to a machine element. The lubricant level is predetermined for the particular application and cannot be changed during the operating time of the machine to which the constant level lubricator is attached. Although this type of lubricator provides reasonable performance in many steady-state operations, multiple variables can create unacceptable operating conditions and lead to premature wear, or even failure, of machine elements. The variables include "on" and "off" operating modes (machine cycling), oil viscosity, machine speed, lubricant temperature, lubricant condition, and lubricant vessel pressure.

The present volumetric lubricant dispenser controls all of the above variables to provide optimum operating conditions. An automatically controlled system is adjusted by means of a microprocessor that receives input from various system sensors and adjusts the lubricant level accordingly. In the automatic mode, the entire system is constantly monitored. The machine operator, based upon external measurements such as temperature, pressure, electrical current draw, etc, adjusts the manually controlled system.

Additionally, it is important to note that a distinction should be made between qualitative and quantitative control of lubricant condition. Quantitative control of lubricant condition is concerned with delivering or removing precise quantities of lubrication; i.e. volumetric control. Qualitative control is concerned with maintaining and monitoring the preferred characteristics of the lubricant.

The present invention is directed at two systems: A system for quantitative control and a system for qualitative control. Each system may be used independently of the other or in combination with the other.

SUMMARY OF THE INVENTION

The volumetric lubricant dispensing apparatus of the present invention relates generally to the field of lubrication and specifically to the field of devices which deliver a constant volume and quality of lubricant to a machine element. The present volumetric lubricant dispenser is designed to deliver a precise volume of lubricant to a rotating element or machine part. The rotating element may include a bearing or a journal or the combination of the two. In a typical application, a bearing includes an inner and an outer race. Between the races a plurality of rolling elements usually balls, are positioned. If the outer race is attached to the bearing housing, the inner race and the rolling elements are rotated into and out of a lubricant reservoir. The reservoir is maintained within the bearing housing.

Lubricant is supplied to the reservoir at a rate sufficient to maintain a volume of oil in the reservoir so that the lubricant is applied to the rotating element or machine part in the same manner for each rotation of the element. The lubricant delivery system of my invention is essentially a piston and cylinder assembly. The piston will maintain a lubricant volume in a predetermined condition where the rotating element can pick up the optimum amount of lubricant required for optimal lubrication.

The present invention overcomes a problem experienced in the field with prior art lubricant dispensers. A rotating element, such as a journal, will create a waveform within the lubricant contained within the lubricant reservoir. Accordingly, the position or location of the lubricant in the reservoir is not constant. For example, the level of lubricant at one side of the reservoir may be lower than the lubricant level at the opposite side of the reservoir. As the speed of the rotating journal is increased or decreased, the waveform may become more or less pronounced.

Before proper lubrication of the rotating element can be achieved, there are a number of variables, which must be considered. These include the difference in lubrication level between the "on" and "off" operating modes (cycling modes) of the machine element being lubricated, the viscosity of the lubricant, the type of lubricant used and its condition, and the pressure within the lubrication system. It is a goal of the present invention to provide a volumetric lubricant dispenser, which can control all of the above noted variables and insure an acceptable operating condition. The device of the present invention is envisioned to be either automatic or manual in its mode of operation.

The present invention controls the volume of lubricant and/or maintains the consistency of the lubricant supplied to the reservoir by dispensing the lubricant with an actuated plunger located in a dispensing cylinder. The dispensing cylinder is coupled to the reservoir. The plunger is actuated by means of a drive motor which either advances or retracts the plunger depending upon a command or signal received from a control unit or microprocessor which monitors at least one condition of the lubricant. For example, if the temperature of the lubricant were being monitored, temperature data would be input into an algorithm or formula programmed into the microprocessor or similar control device. The amount of lubricant in the reservoir could be increased or decreased depending upon the temperature input and the algorithm output. Additionally, other variables of the lubricant can be measured and the volume of the lubricant adjusted accordingly. Another example may include the viscosity of the lubricant, the speed of the rotating element, the pressure within the reservoir, or the lubricant's condition. Alternatively, the relative acidity of the lubricant could be monitored and compared against a base line level and the amount of lubricant required within the reservoir could be adjusted accordingly. This type of monitoring allows for fresh lubricant to be added to the reservoir as the present lubricant is consumed, chemically broken down, or contaminated.

Alternatively, for the purpose of qualitative control the present invention may be described as a system intended for controlling lubricants, both mineral (natural) and synthetic based by measuring the condition characteristics of the lubricant. Some condition characteristics may include water or moisture content (the content could be any liquid, e.g., solvents like ketones are known to change condition characteristics like viscosity) and viscosity. Viscosity is related to temperature, therefore, temperature correlation to viscosity is helpful to provide relative indications for condition characteristics like lubricant flow.

Accordingly, an apparatus for qualitative lubricant condition control and monitoring may include but not be limited to the following illustrative description. The apparatus comprises at least one lubricant condition-sensing module. The module may be of any suitable type for sensing a desired lubricant characteristic. For example the module could be a device like a humidity or temperature sensor or transducer. The lubricant sensing module will also be communicatively coupled to a qualitative control mechanism. For example, the qualitative control mechanism could be a microprocessor. The qualitative control mechanism is also communicatively coupled to at least one response mechanism, e.g., a lubricant pump. The qualitative control mechanism being capable of actuating at least one response mechanism in response to a signal received from at least one lubricant condition-sensing module and interpreted by the qualitative control mechanism.

DESCRIPTION OF THE DRAWINGS

FIGS. 12–25 are exploded perspective views of the components of the commercially preferred embodiment of the present invention illustrating the mechanical structure and interrelationship of component parts.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
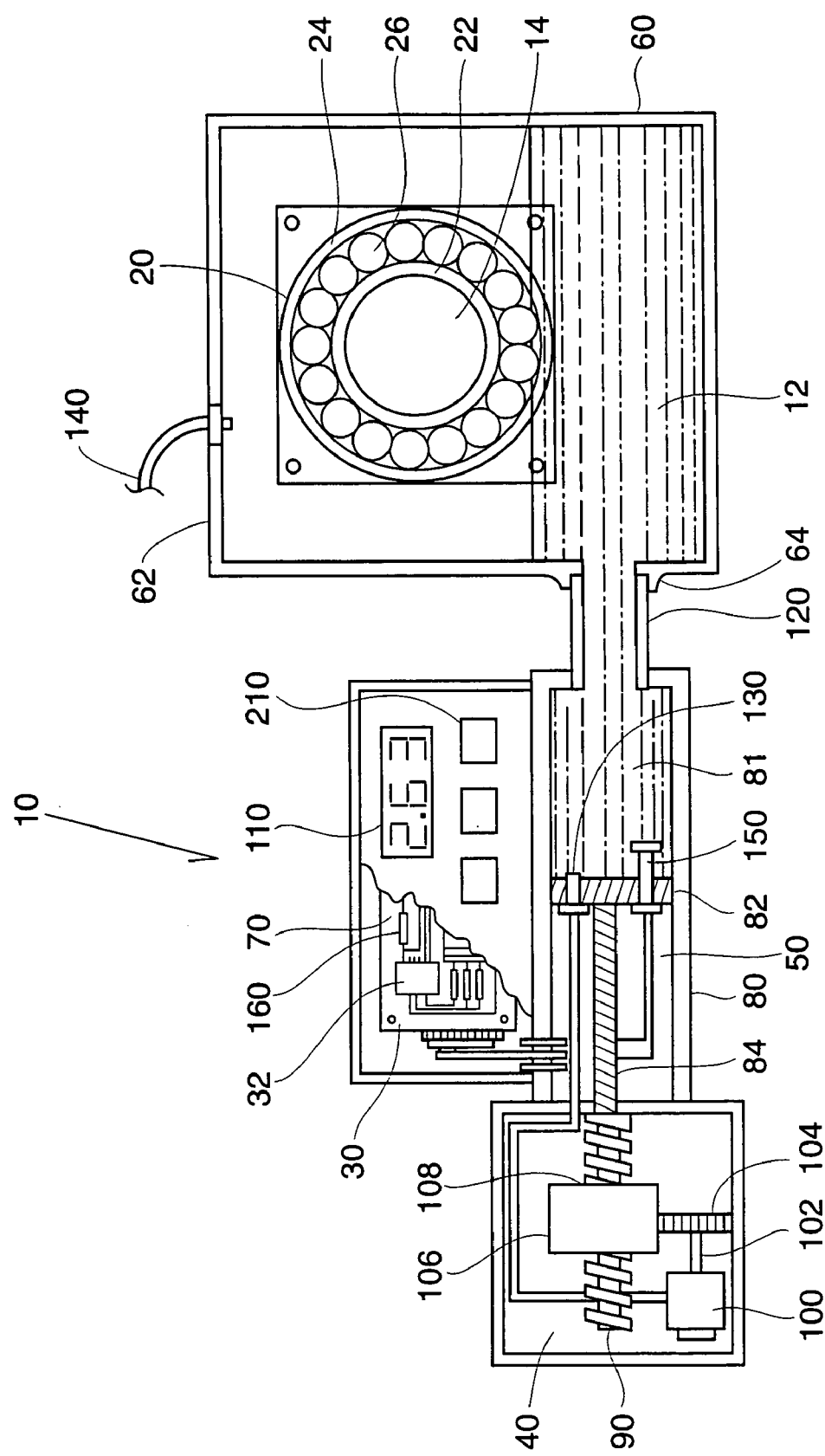
FIG. 1 is a partially cut away front elevational view of the volumetric lubricant dispensing apparatus.

The present invention in one form comprises a volumetric lubricant dispensing apparatus. The invention is best shown in FIG. 1 at reference number 10. The components of my invention can be seen to include a control unit 30, a drive unit 40, a dispensing mechanism 50, a reservoir 60, a printed circuit board 70, a cylinder 80, a drive screw 90, a drive motor 1100, a liquid crystal display 110 and an adapter fitting 120. In addition, there are multiple sensors that complete the system. These sensors include a temperature sensor 130, a vibration sensor 140, a pressure sensor 150 and a power primary sensor 160. The invention provides an optimal lubrication condition to machine element or bearing 20.

Lubricant 12, such as oil, is contained within the fluid reservoir 60. In my preferred embodiment, the fluid reservoir 60 comprises a bearing housing shown in FIG. 1 at 62. A bearing, shown at 20 in FIG. 1, is located within the bearing housing 62. Bearing 20 includes an inner race 22, an outer race 24, and a plurality of rolling ball elements 26 positioned between inner race 22 and outer race 24. In order for bearing 20 to perform its function of maintaining a low friction precision relationship between rotating element or shaft 14 and bearing housing 62, the bearing 20 must operate in an environment where it receives proper lubrication.

To achieve proper lubrication, bearing housing 62 or reservoir 60 is filled with a predetermined amount of lubricant 12. When the machine, of which bearing 20 is a component, is in a static state, the amount of lubricant 12 within the housing 62, the pressure of the lubricant 12, the distribution of the lubricant 12 within the housing 62, and the temperature of the lubricant 12 are constant. Once the machine is set in motion and journal 14 begins to rotate, the lubricant's characteristics begin to change. These characteristics can continue to change during the run cycle of the machine.

Bearing housing 62 includes an opening or passageway 64 that allows for the addition and removal of lubricant 12.

Passageway 64 is connected to an adapter fitting 120. Adapter fitting 120 fluidly connects bearing housing 62 with the volumetric lubricant dispenser 10. Fitting 120 could be replaced with a pipe or tube to suit the application.

Volumetric lubricant dispenser 10 includes a cylinder 80 within which a plunger 82 is sealed about the cylinder's inner surface 81. A connecting rod 84 is connected to the back side of the plunger 82 and extends through the dispenser 10 where its opposite end is connected to a screw drive 90.

A drive motor 100 is mounted within the dispenser 10. A drive shaft 102 is connected to the drive motor 100 output. The drive shaft 102 is in turn connected a drive gear 104. The gear teeth of drive gear 104 engage with similar gear teeth on the exterior surface of driven gear 106. Driven gear 106 has a geared opening or aperture 108 which runs through its central portion and which engages with screw drive 90. Thus, when drive motor 100 operates in a first direction, plunger 82 is driven into cylinder 80. When drive motor 100 operates in the second opposite direction, plunger 82 is retracted from cylinder 80. As can be seen in FIG. 1, additional lubricant 12 is displaced into bearing housing 62 when the plunger 82 is driven into cylinder 80. Conversely, lubricant is removed from bearing housing 62 when the plunger 82 is retracted.

Various sensors are placed on the volumetric lubricant dispenser 10. Each sensor provides an input to the printed circuit board 70, which contains a controller or microprocessor 32. Drive motor 100 is controlled by an output of the printed circuit board 70. When a sensor feeds input into the microprocessor 32 of the printed circuit board 70 indicating that either more or less lubricant is needed in the bearing housing 62, the microprocessor 32 sends a signal to drive motor 100. Drive motor 100 is capable of rotating in both a clock-wise and a counter-clock-wise direction. Depending upon the signal sent, the drive motor 100 operates in either a clock-wise or counter-clock-wise direction. Rotation in a clock-wise direction will cause drive screw 90 to push plunger 82 further into cylinder 80 and thus raise the lubricant level within bearing housing 62. Rotation in a counter-clock-wise direction will, alternatively, cause the plunger 82 to retract from cylinder 80 and thus decrease the lubricant level in bearing housing 62.

Referring again to FIG. 1, the location of the various sensors can be seen. The sensors incorporated into my invention can include a temperature sensor 130, a vibration sensor 140, a pressure sensor 150, and a power sensor 160. Each sensor 130–160 is electronically connected to circuit board 70 and provides an input signal to the microprocessor 32.

My volumetric lubricant dispenser 10 includes a digital read-out 110 capable of displaying the input from at least one of the sensors 130–160. For example, the temperature of the lubricant or the pressure of the lubricant can be displayed on read-out 110. The dispenser 10 also includes control switches 210. These switches are used to manually control the lubricant level within bearing housing 62 either during set up, start up, or during manual operation.

Sensor 130 monitors the temperature of the lubricant. A bearing operating in a poorly lubricated environment will dissipate excess heat generated by the bearing into the lubricant. If the lubricant begins to break down, it cannot properly perform its function of providing a reduced friction substrate between the bearing components and dissipating heat away from the bearing. If the lubricant temperature exceeds a known level, the microprocessor 32 signals drive motor 100 to add more lubricant to the bearing housing 62. The additional lubricant 12 helps to rejuvenate the present lubricant and helps to dissipate excess heat.

Sensor 140 is a vibration sensor that monitors the vibration of bearing housing 62. Again, improper lubrication of bearing 20 may result in a vibration in excess of a preset maximum vibration level. When the maximum vibration level is exceeded, sensor 140 sends a signal to the microprocessor 32 whereby additional lubricant is again added to the bearing housing 62.

Pressure sensor 150 constantly monitors the lubricant pressure within bearing housing 62. If the pressure falls below a predetermined setting, improper lubrication of bearing 20 is likely to occur. In this situation, the microprocessor 32 would send a signal to the drive motor thereby adding more lubricant 10 to the bearing housing 60, increasing the lubricant level, and increasing the lubricant pressure above the required minimum.

Sensor 160 comprises a power sensor. This sensor is attached to the machine of which the bearing 20 is a component. Power sensor 160 determines when the machine is in an operational mode and thus controls the remaining sensors 130–150. My invention 10 is designed to operate and respond to the other sensors 130–150 only when the machine of which bearing 20 is a component is running.

Additionally, an EHD type level sensor may be added to the present invention to provide a signal to indicate if lubricant should be added or subtracted from the invention 10.

Figure 2:
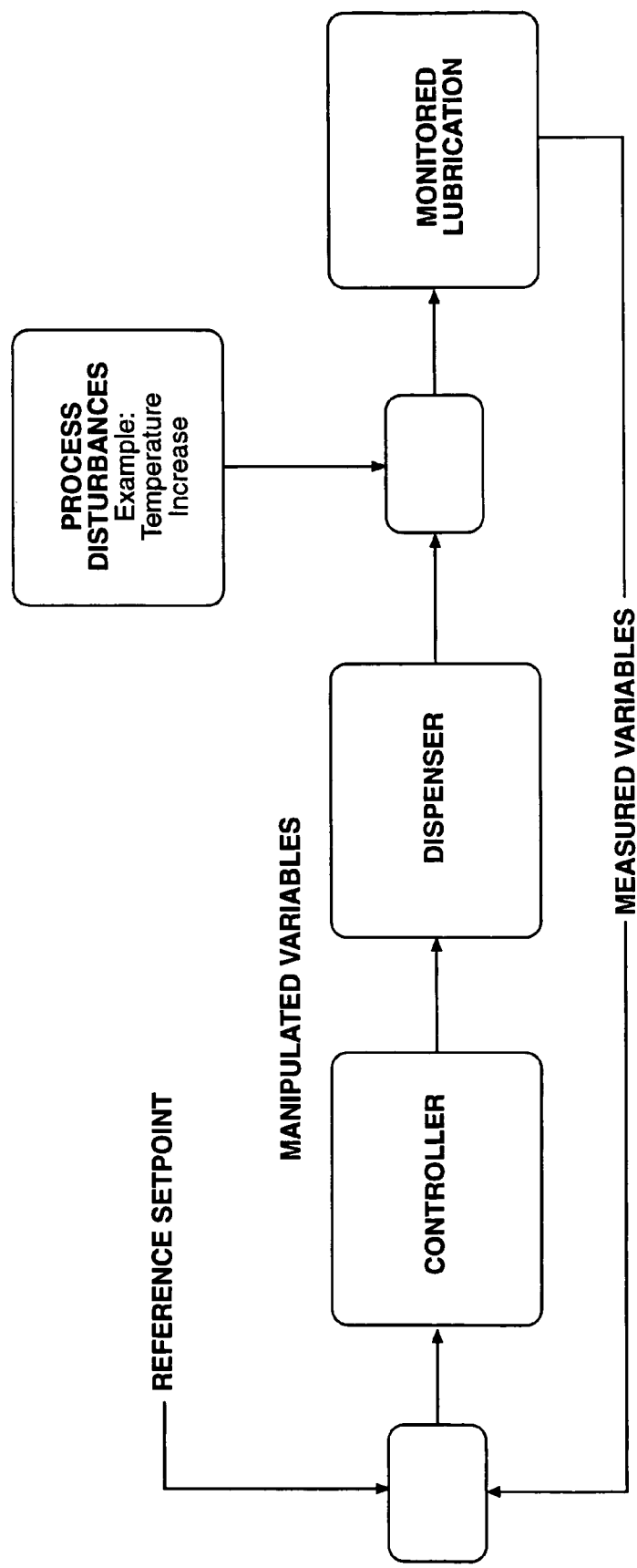
FIG. 2 is a flow chart depicting the control loop control of the volumetric lubricant dispensing apparatus.

FIG. 2 depicts a flow chart of the closed loop control operation of my invention 10. Beginning at the reference set point, the nominal or minimum operating parameters is preset from the component operational requirements of the machine elements. For example, the nominal or minimum operating conditions of the bearing 20 is entered into the controller 30. When one or more of the monitored lubrication sensors 130 through 160 (measured variables) sends a signal to the controller 30 indicating that its parameters have been exceeded, the controller 30 sends a signal to drive unit 40. It should be noted that in the process disturbance step the lubricant conditions being monitored include any or all of the lubricant conditions discussed herein. When the monitored lubricant condition exceeds the reference set point or parameter, the controller 30 sends a signal to the drive unit 40 instructing it to act accordingly.

For example, when the monitored process begins, each sensor 130 through 160 begins with a verification that the condition it monitors (measured variable) is within the allowable pre-programmed range. If each sensor indicates that its condition falls within the required range, the monitored process is continued with no drive unit 40 and dispenser mechanism 50 actuation. If one or more of the sensors 130 through 160 senses a condition that falls outside of the predetermined parameter range, the controller 30 sends a signal to the drive unit 40 thereby instructing it to actuate the drive motor 100 in either the forward direction or backward direction whereby the lubricant volume is either increased or decreased. Once the lubricant volume has been adjusted, the monitoring process resumes.

Figure 3:
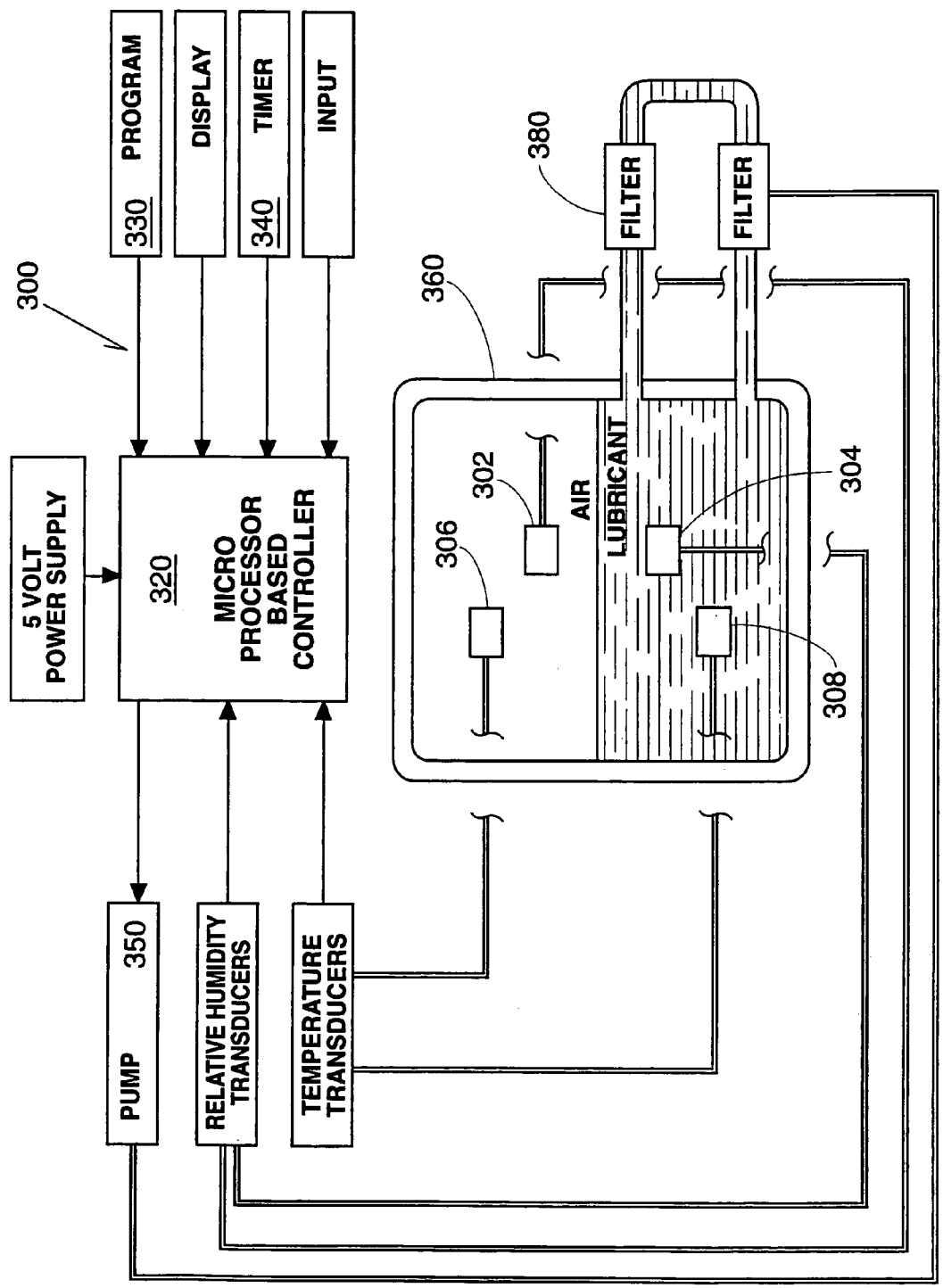
FIG. 3 is a schematic view of a system intended for controlling the condition of lubricants by maintaining specified water content levels.

Referring now to FIG. 3, an alternative lubricant condition control mechanism 300 is illustrated. The mechanism 300 is intended for controlling the condition of lubricants by maintaining specified water content levels. Preferably, but not by way of limitation, this is accomplished by providing on-line real time data collection. Water contamination is a leading contributor to reduction of lubrication performance, which results in shortening, unnecessarily, the effective operational life of the machinery requiring lubrication.

The lubricant condition control mechanism 300 utilizes and includes two relative humidity transducers 302 and 304. Humidity transducer 302 measures the humidity of the air in the equipment housing or sump 360. Humidity transducer 304 is submerged in the lubricant and measures the humidity of the lubricant. Both transducers 302 and 304 collect the humidity information and convert it into electrical signals, which the microprocessor 320 may then utilize in association with a predetermined microprocessor program 330. Each transducer 302 and 304 measures the relative humidity of the air and the lubricant, respectively, at predetermined intervals utilizing timer 340.

While the use of two humidity transducers 302 and 304 is presently considered best it is to be understood that more humidity transducers could be used or even a single humidity transducer could be used. The humidity transducer or humidity transducers could measure only the humidity of the air, only the humidity of the lubricant, or both. Further, while it is presently believed best to measure humidity at predetermined intervals, humidity could be measured continuously in a stream of data, e.g., in an analog type system.

Figure 26:
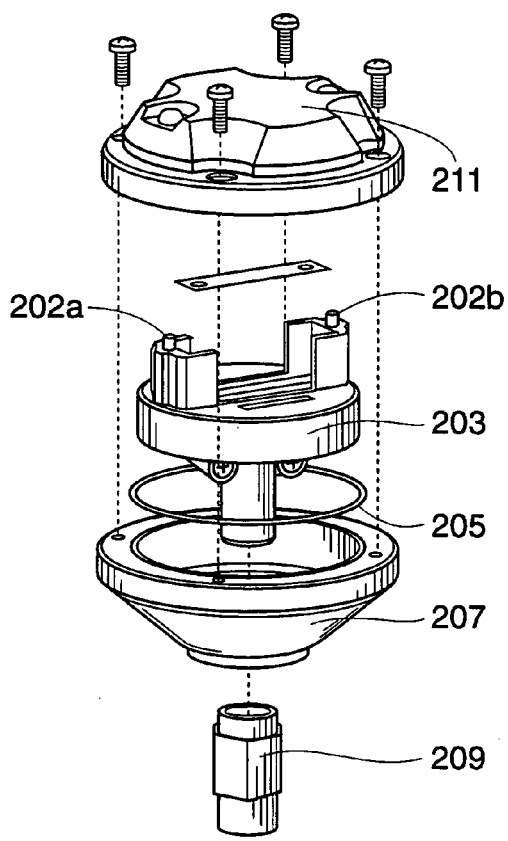
FIG. 26 is an exploded view of a moisture sensing mechanism that may or may not be used in combination with the present invention.
Figure 27A:
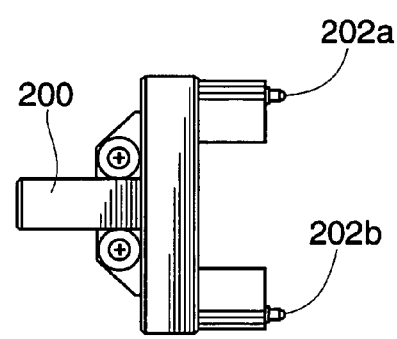
FIGS. 27A, 27B, and 27C are a series of perspective views showing the inside housing structure of moisture sensing mechanism that may or may not be used in combination with the present invention.
Figure 27B:
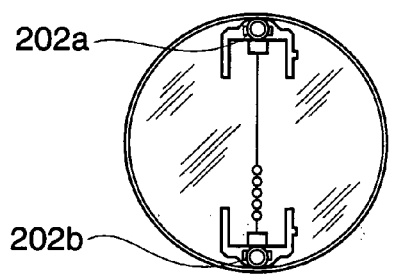
Figure 27C:
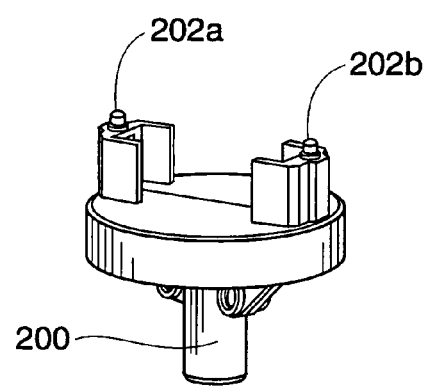
Figure 28:
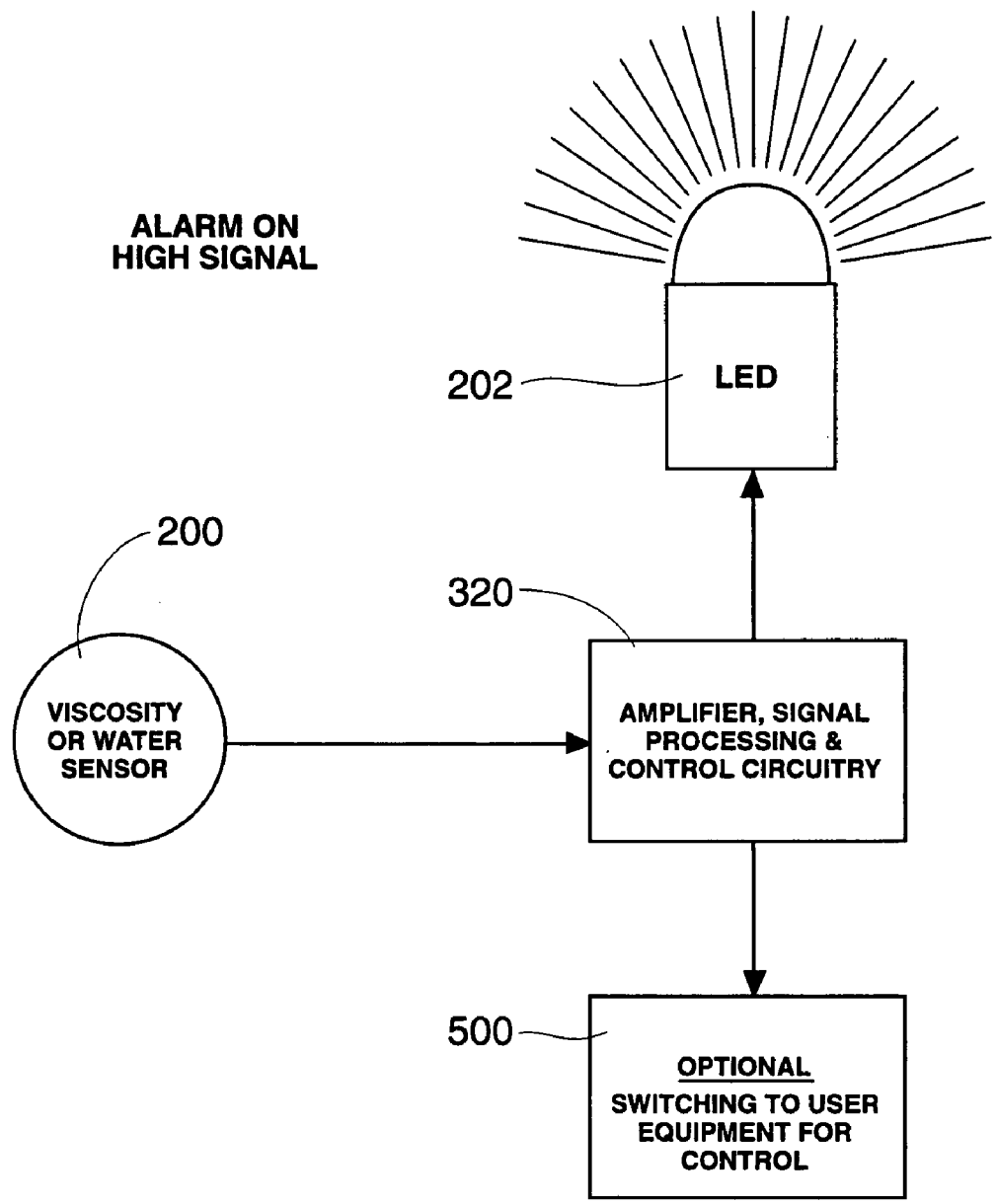
FIG. 28 is a schematic block diagram of the major and optional components of the moisture sensing mechanism and their relative relationships.

For example, referring to FIGS. 26–28 a stand alone humidity sensing mechanism 200 is provided having a Model EMD 2000 humidity sensor of the type sold by General Eastern, a Banthorpe PLC Company, located at 20 Commerce Way, Woburn, Mass. 01801-1057. The humidity sensor may be used as part of the on-line system for measuring oil described herein or it may be used independently. For instance, by way of example and not by way of limitation, the humidity sensing mechanism 200 is capable of indicating a change in humidity condition.

In its commercially preferred form the humidity sensing mechanism 200 is capable of turning on or off an indicating mechanism 202, e.g., a light or LED, when a predetermined safe level of humidity is present. Alternatively, the humidity sensing mechanism 200 may also be capable of turning on or off an indicating mechanism 202 when a predetermined unsafe level of humidity is present. Indeed, depending upon the type of sensor chosen, e.g., humidity, viscosity, temperature, etc., the sensing mechanism 200 may used to take a predetermined action in response to a predetermined condition being met. For example, the sensing mechanism 200 may also be capable of switching the monitored equipment on or off at a predetermined control point or other set condition.

Referring back to FIG. 3, the lubricant condition control mechanism 300 also utilizes two temperature transducers 306 and 308. Temperature transducer 306 measures the temperature of the air in the equipment housing or sump 360. Temperature transducer 308 is submerged in the lubricant and measures the temperature of the lubricant. Both transducers 306 and 308 convert and collect information into electrical signals, which the microprocessor 320 may then utilize in association with the predetermined microprocessor program 330. Each transducer 306 and 308 measures the relative temperature of the air and the lubricant, respectively, at predetermined intervals utilizing timer 340.

While the use of two temperature transducers 306 and 304 is presently considered best it is to be understood that more temperature transducers could be used or even a single temperature transducer could be used. The temperature transducer or temperature transducers could measure only the temperature of the air, only the temperature of the lubricant, or both. Further, while it is presently believed best to measure temperature at predetermined intervals, temperature could be measured continuously in a stream of data, e.g., in an analog type system.

When a predetermined level of moisture contamination or temperature is ascertained a switching command from the microprocessor 320 causes the lubricant pump 350 to engage and lubricant is pumped through filter 380. The lubricant is pumped and circulated through the filter 380 until the predetermined humidity and/or temperature levels are reached, which indicate that the lubricant has, again, reached the desired level of cleanliness.

Figure 4:
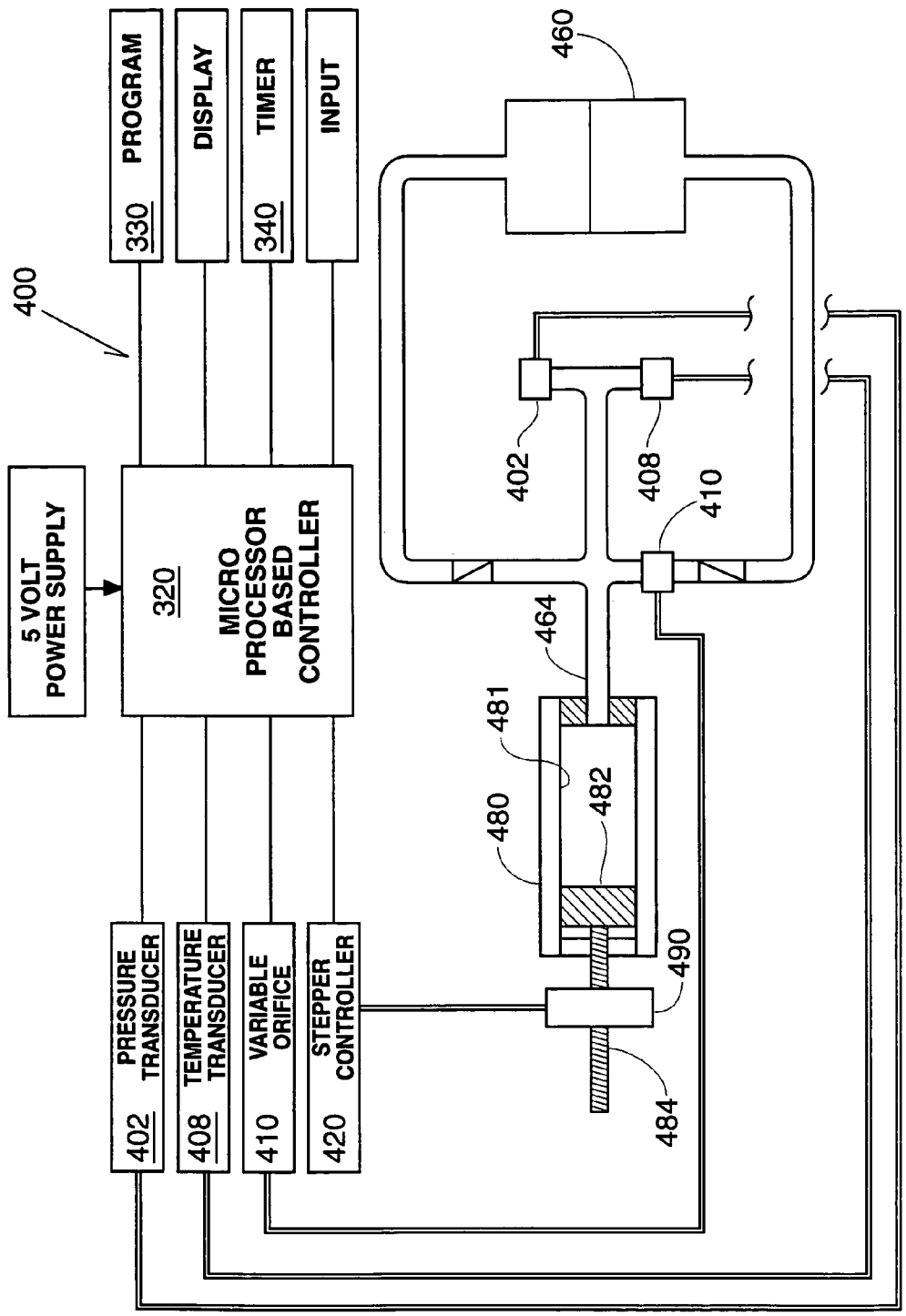
FIG. 4 is a schematic view of a system intended for determining viscosity by measuring flow characteristics.

Referring now to FIG. 4, a lubricant control mechanism 400 for determining the viscosity of a lubricant may be seen. The mechanism 400 includes a temperature transducer 408, a pressure transducer 402, a variable flow orifice 410, and a stepper controller motor 420. The mechanism 400 further includes a microprocessor 320, a timer 340, and a predetermined microprocessor program 330. The stepper controller motor 420 works in conjunction with a screw drive 490 which may be engaged to advance or retract a plunger 482 which is coupled to threaded shaft 484. The cylinder 480 has an inner wall 481 against which the plunger 482 may slide. A passageway 464 communicatively couples the cylinder 480 to the sump 460, the pressure transducer 402, and the temperature transducer 408.

The variable flow orifice 410 is presently a fixed dimension and the stepper motor 420 varies flow so that pressure is controlled by orifice size and stepper motor 420 speed. Alternatively, the orifice 410 may be designed so that its dimension can be made to vary, e.g., by use of an iris valve. Accordingly, pressure may then be controlled by merely adjusting orifice size, adjusting stepper motor 420 speed, or by adjusting both.

Further, it is presently believed to be commercially preferable to include a filter in-line with the variable flow orifice 410 so that particulate matter may filtered out of the lubricant prior to it passing through the variable flow orifice. This would aid in preventing clogging of the orifice 410. It would also aid in removing overall particulate contamination from the lubricant.

The mechanism 400 uses four elements to determine lubricant flow characteristics with a hydraulic cylinder 480: pressure, distance of plunger 482 stroke, time, and temperature. It is preferred that time be measured each time a viscosity analysis is done so that it may be used as benchmark. Viscosity analyses are conducted according to a predetermined schedule by typically engaging the stepper controller motor 420. During each viscosity analysis at least two of the remaining three conditions must be constant and one variable. For example, if time and distance are constant then the pressure will vary proportionally with changes in viscosity for a given temperature.

Figure 7:
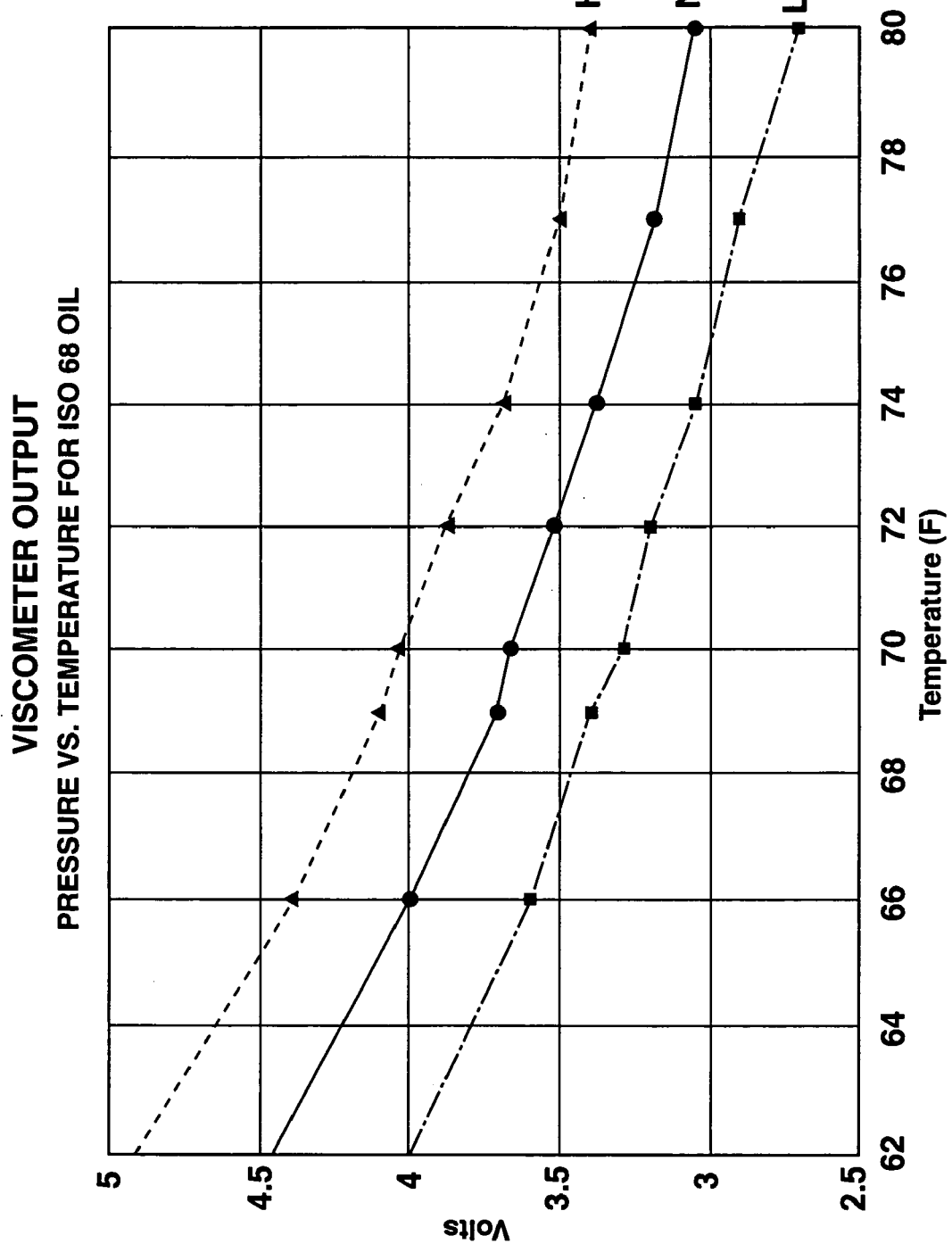
FIG. 7 is a chart illustrating how a baseline measurement may be taken to set a baseline for determining viscosity of an oil or lubricant as a reference point from which variations in viscosity may be determined for a range of lubricants having the same or different weights as the lubricant used for setting the baseline or the same or different temperatures, conductivity, etc. as the lubricant used for setting the baseline measurement.

Comparing the measured viscosity to a known baseline viscosity performs the viscosity analyses. The baseline viscosity is determined as illustrated in FIG. 7 wherein a high limit, a low limit, and a nominal baseline value are all determined for a known weight of oil. This baseline may be preprogrammed, as discussed below, into the mechanism of the present invention or it may be provided in a look-up table for the user's reference. Changes in oil weight from the base line oil weight may be taken into account by the preprogrammed information or look-up tables. For example, the change in viscosity may be determined using a known corrective factor related to the change in the weight of the oil or lubricant used or several different weight oils could be used to produce several different baselines of data from which the appropriate viscosity information may be extrapolated using either a look-up table or formula preprogrammed into the mechanism of the present invention or by providing a look-up table for use in combination with the mechanism of the present invention.

The mechanisms described in FIGS. 3 and 4 both allow for the collection of data and the storage of that data in a memory system for future reference. Also, the stored data can be used to identify situations that are not desirable when data is indicating a trend toward undesirable conditions so those problems may be identified before they occur. The data may be made available for use by algorithms (computer programs) programmed into the microprocessor. The data may also be provided to a user via means of a read out structure so that the user may use a look-up table or other predetermined reference material and then make an appropriate condition monitoring decision regarding the lubricant.

Figure 5:
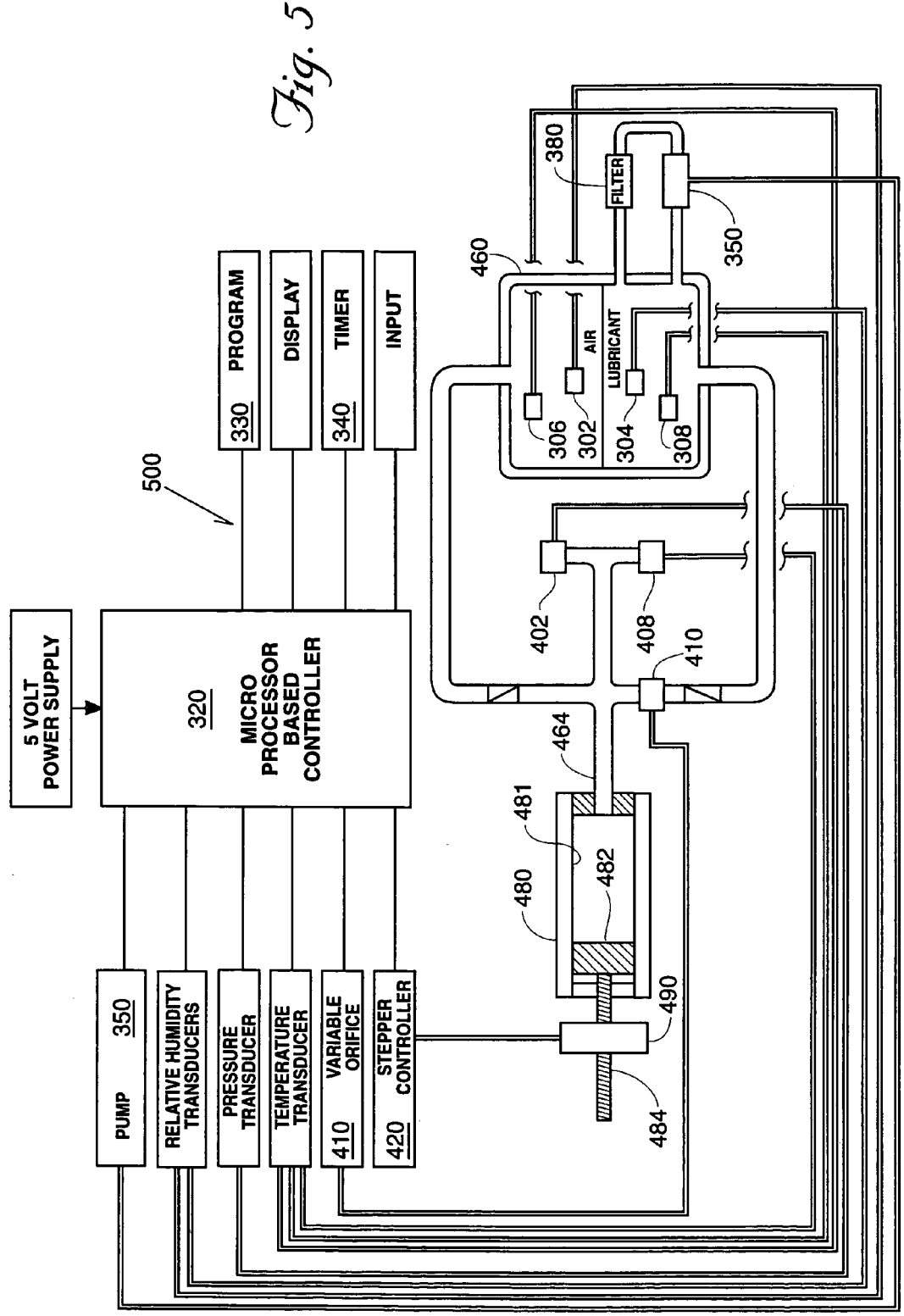
FIG. 5 is a schematic view of the combined systems of FIGS. 3 and 4 illustrating a system for controlling and monitoring lubrication contamination and degradation.

Referring now to FIG. 5, another embodiment of the present invention may be seen. The lubricant condition control monitoring mechanism 500 combines the features and functions of the embodiments shown and described in FIGS. 3 and 4 into one device. Accordingly, a device 500 is produced which is capable of all the condition control monitoring functions described in reference to respective FIGS. 3 and 4.

Figure 8:
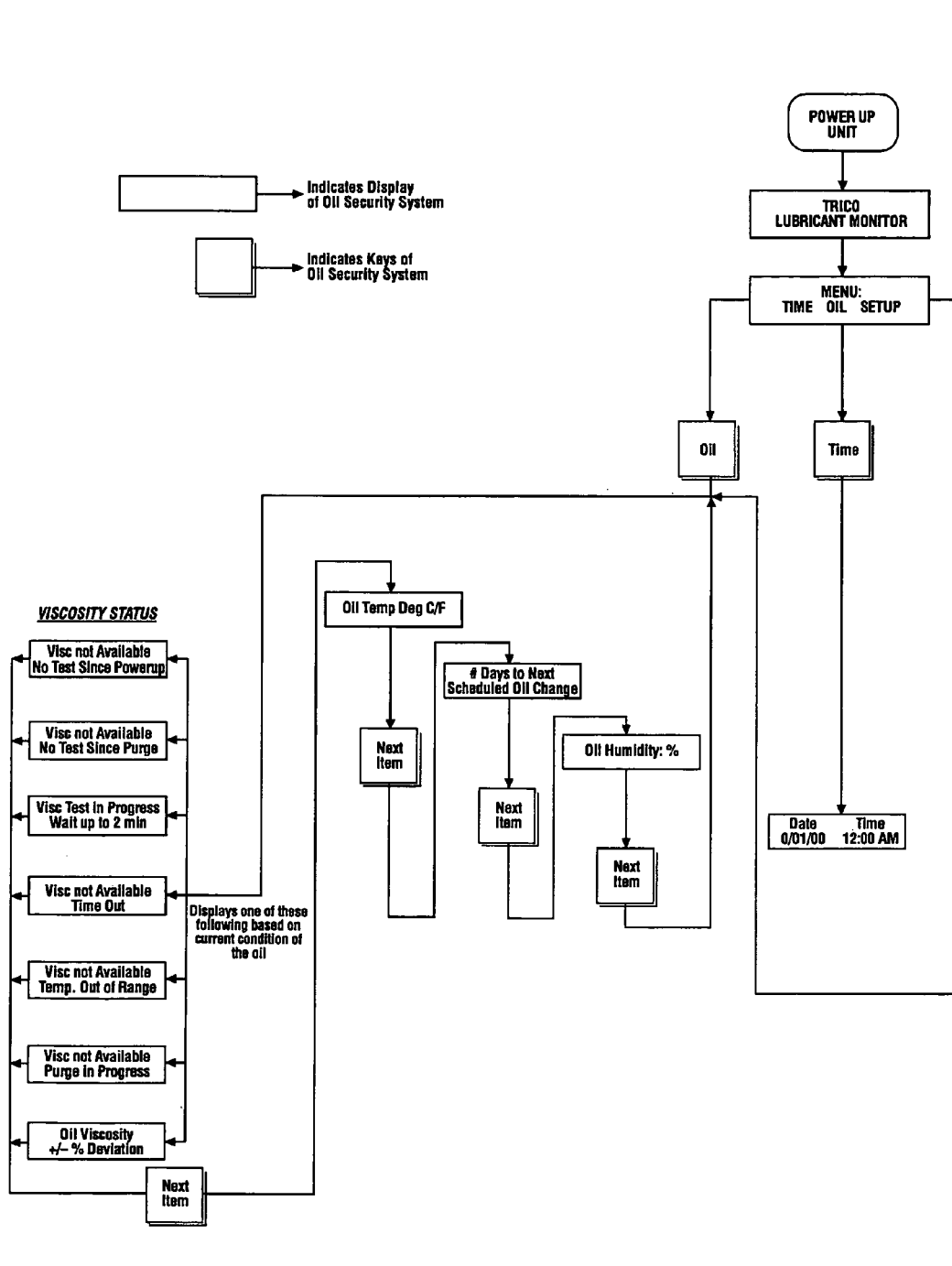
FIG. 8 is a flowchart illustrating keypad operation of the present commercially preferred embodiment of the invention disclosed herein.
Figure 8A:
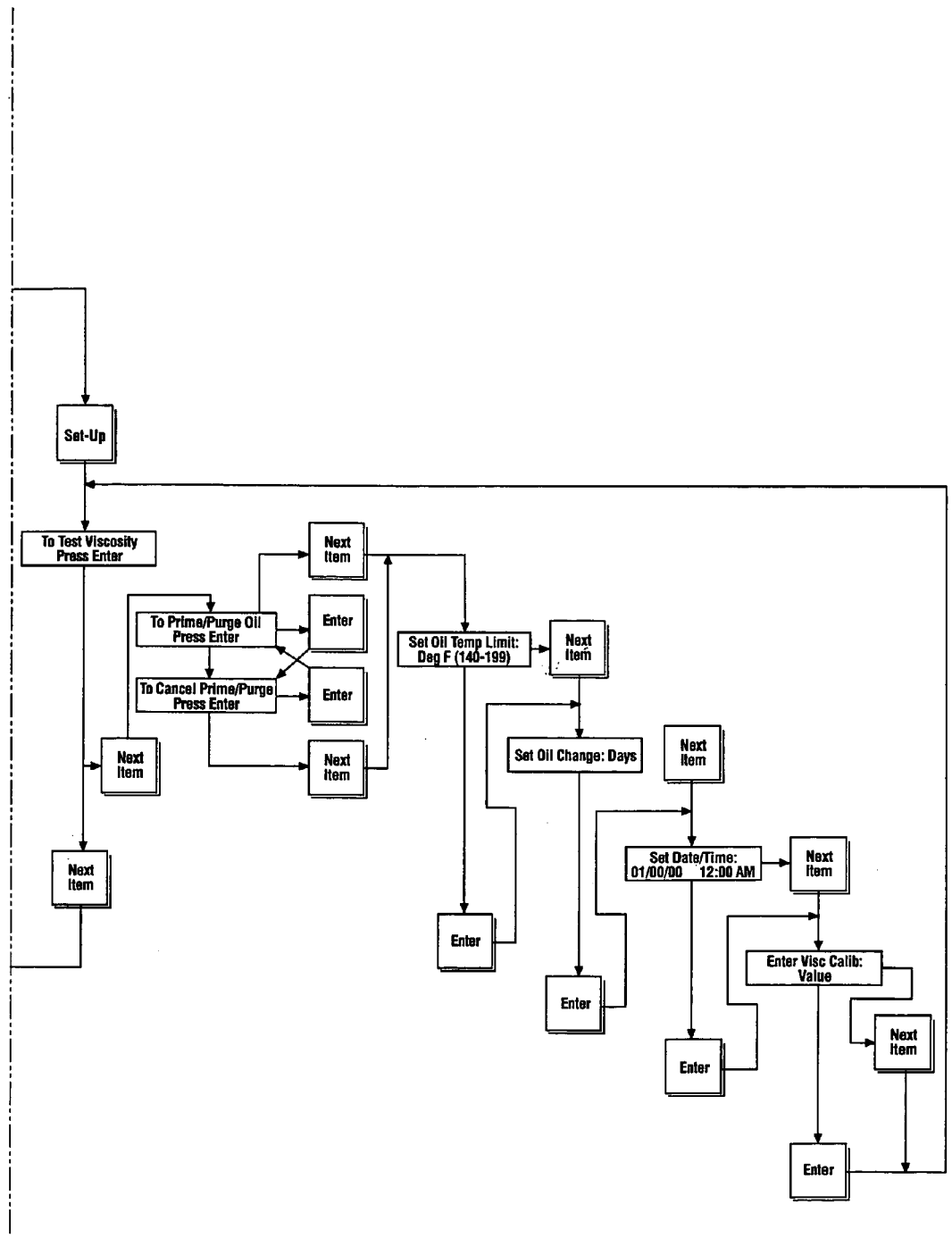
Figure 9:
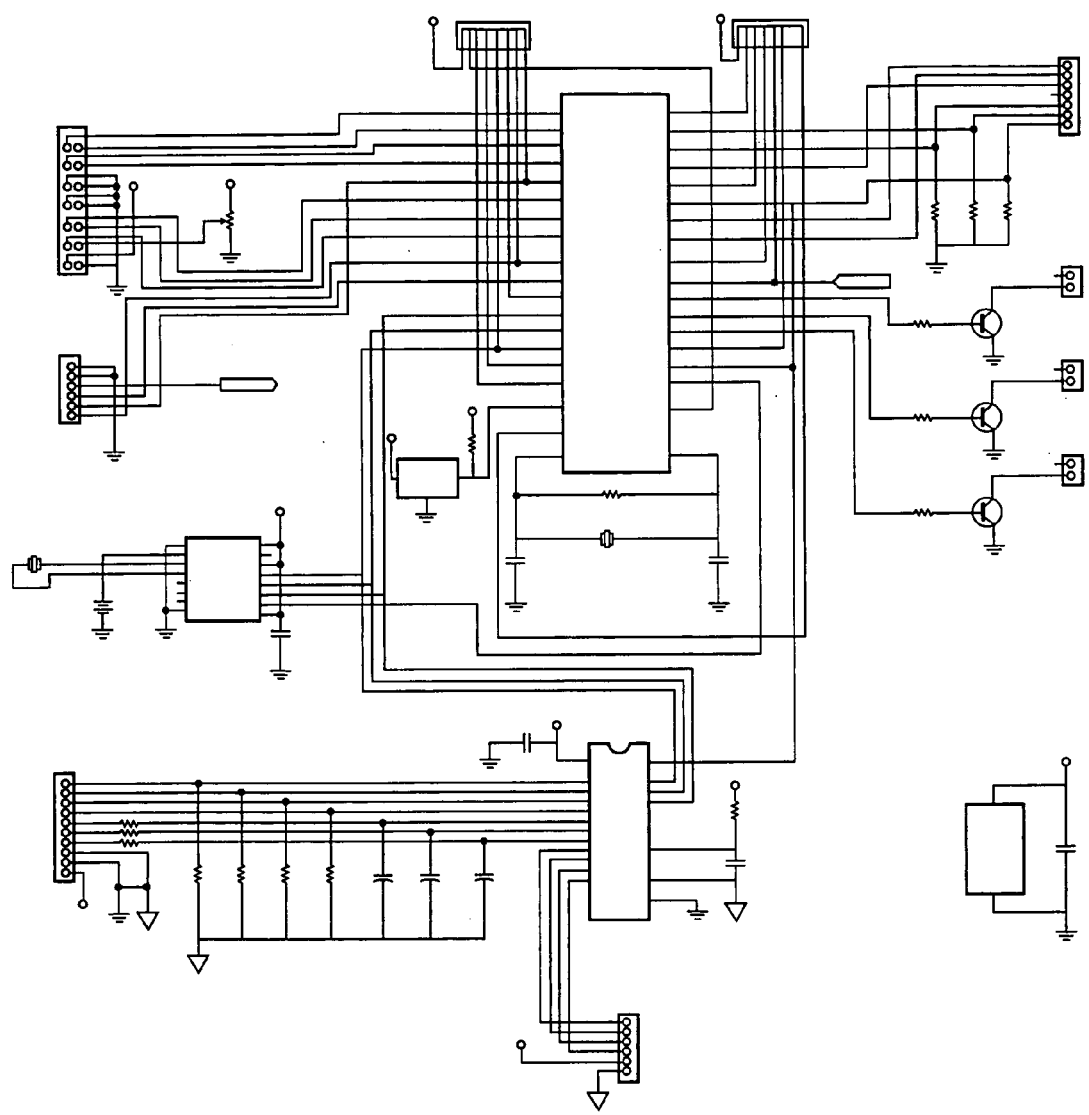
FIG. 9 is an electrical schematic of the CPU circuit for the present invention.
Figure 10:
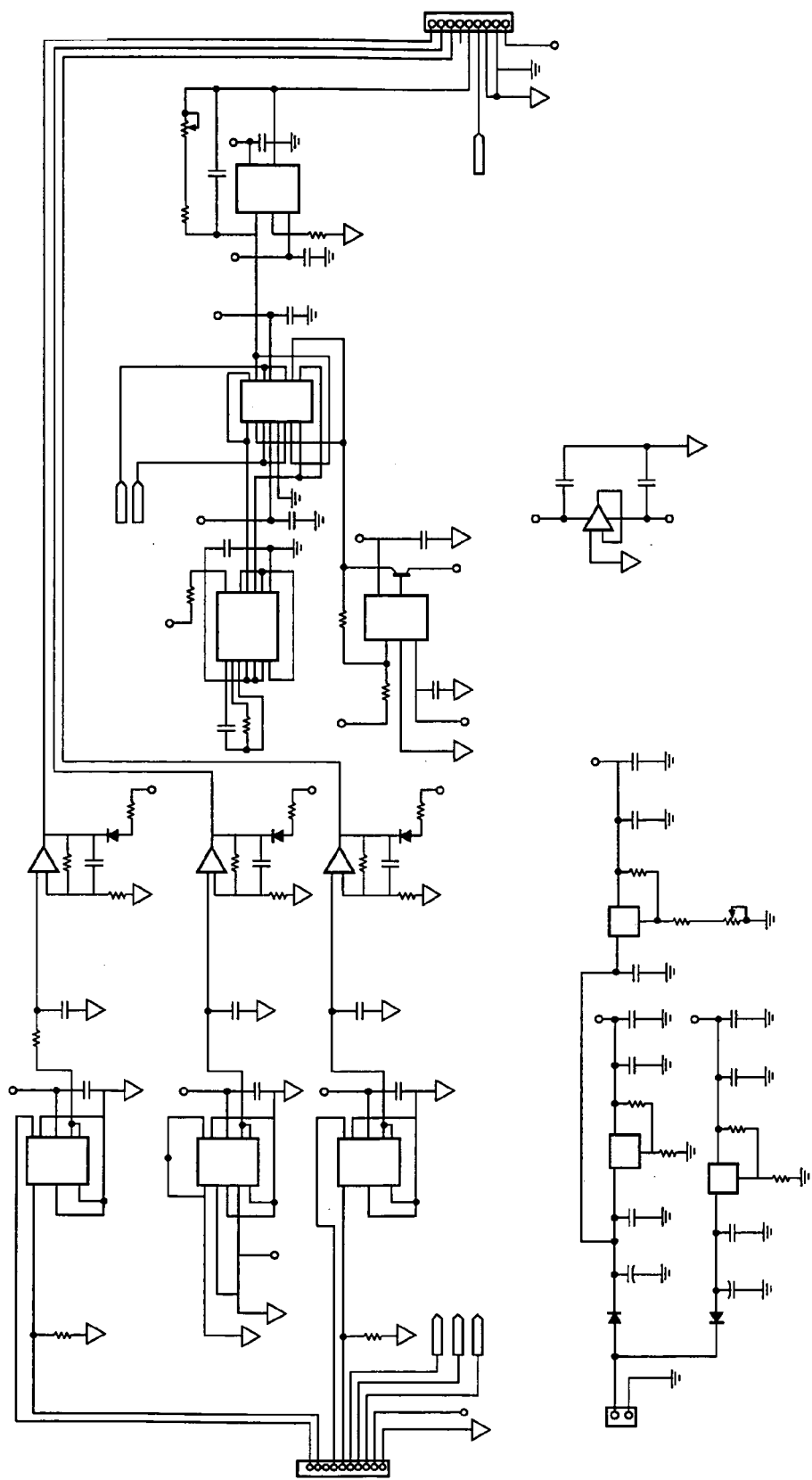
FIG. 10 is an electrical schematic of the V/C and RH circuit for the present invention.
Figure 11:
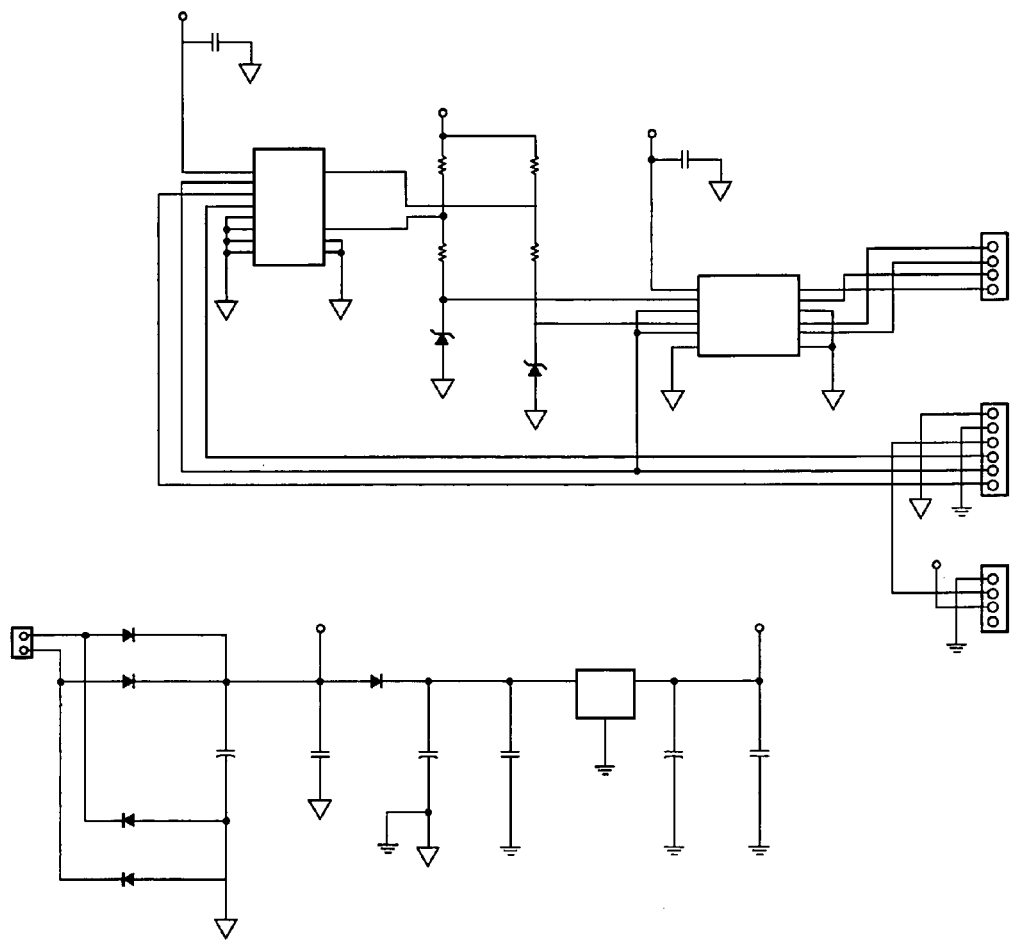
FIG. 11 is an electrical schematic of the stepper driver board.

The software and hardware components of the qualitative monitoring system of the present invention for maintaining and monitoring the preferred characteristics of lubricant are illustrated in FIGS. 6–25. Generally, with reference to FIG. 8, the qualitative monitoring system does online monitoring of the viscosity, temperature, oil humidity, and oil change interval. Oil humidity is the measurement of the amount of dissolved water in oil prior to it becoming emulsified or free water. Oil humidity measurements are in percent of saturated relative humidity. Viscosity measurements are based on a deviation from the nominal viscosity of ISO 68 oil. Oil humidity and oil sump temperature are measured continuously. Viscosity and oil change interval readings are made every 24 hours (viscosity at noon and oil change interval at midnight), although the frequency and timing may be varied as will be apparent to a person of ordinary skill in the art who reads this disclosure. Indications of safe, caution, and alarm modes are provided by green, yellow, and red LED lights respectively. In addition to the LED's, caution and alarm operating modes will blink on the display indicating the status of the problem. When operating conditions occur simultaneously, the first condition to activate a caution or alarm condition will blink on the display until a corrective action occurs to remove it. Then, the next caution or alarm condition will be displayed. Listed below are definitions of what parameters activate each operating mode.

Safe operating mode is indicated by a green light. During this mode the oil humidity is less than or equal to 70%, viscosity deviation is less than or equal to ±10%, and the oil sump temperature is more than 10° F. below oil sump alarm temperature.

A yellow light indicates caution-operating mode. This indicates that the lubricant is approaching unsafe levels for optimum lubricant performance and protection. During this mode one or more of the following is occurring: Oil humidity is greater than 70% but less than or equal to 80%, viscosity deviation is greater than ±10% but less than or equal to ±15%, or oil sump temperature is less than or equal to 10° F. but more than 0° F. below oil sump alarm temperature. The first parameter to activate the caution-operating mode will be blinking on the display. At this time action should be taken to correct the condition.

Alarm operating mode is indicated by a red light. This indicates the lubricant is at unsafe levels for optimum lubricant performance and protection. During this mode one or more of the following is occurring: oil humidity is greater than or equal to oil sump alarm temperature. The first immediate action is required to correct the condition.

It should be noted that after changing the oil the operator needs to go into the "setup" menu and press the "next item" button until "set oil change" is displayed. At this time you can reenter a new value or accept the current value. Press "enter" to accept either. This will reset the days remaining in the oil change interval. After changing the oil or lubricant it is preferred to wait 24 hours to obtain a representative reading for the oil humidity. Further, the oil change interval itself is not indicated by the Caution or Alarm operating mode, it is a reference for the operator to track the life of the particular oil or lubricant used.

The software presently preferred for use in the qualitative monitoring system of the present invention is written in Motorola MC68HC05 assembler language and used in the Motorola MC68HC05-705C9A (705C9A) version of the MC68HC05 (HC05) family of micro-computers. A copy of the complete code is attached to this disclosure as appendix A and is incorporated herein by reference. The 705C9A has approximately 300 bytes of RAM and 16000 bytes of One Time Programmable (OTP) ROM memory.

Figure 6:
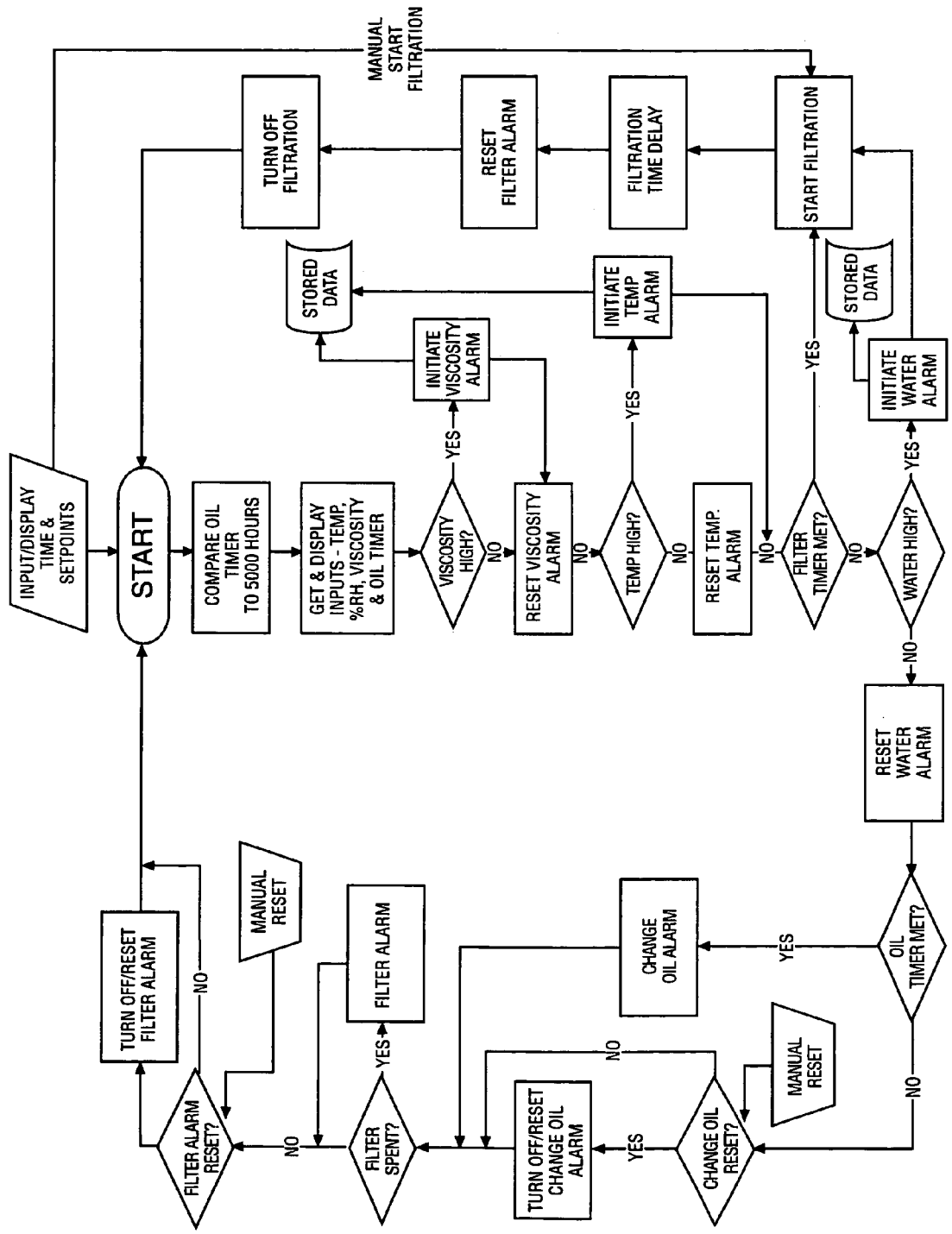
FIG. 6 is a diagram of a type of computer algorithm that may be used in combination with the structure of at least one embodiment of the present invention.
Figure 6A:
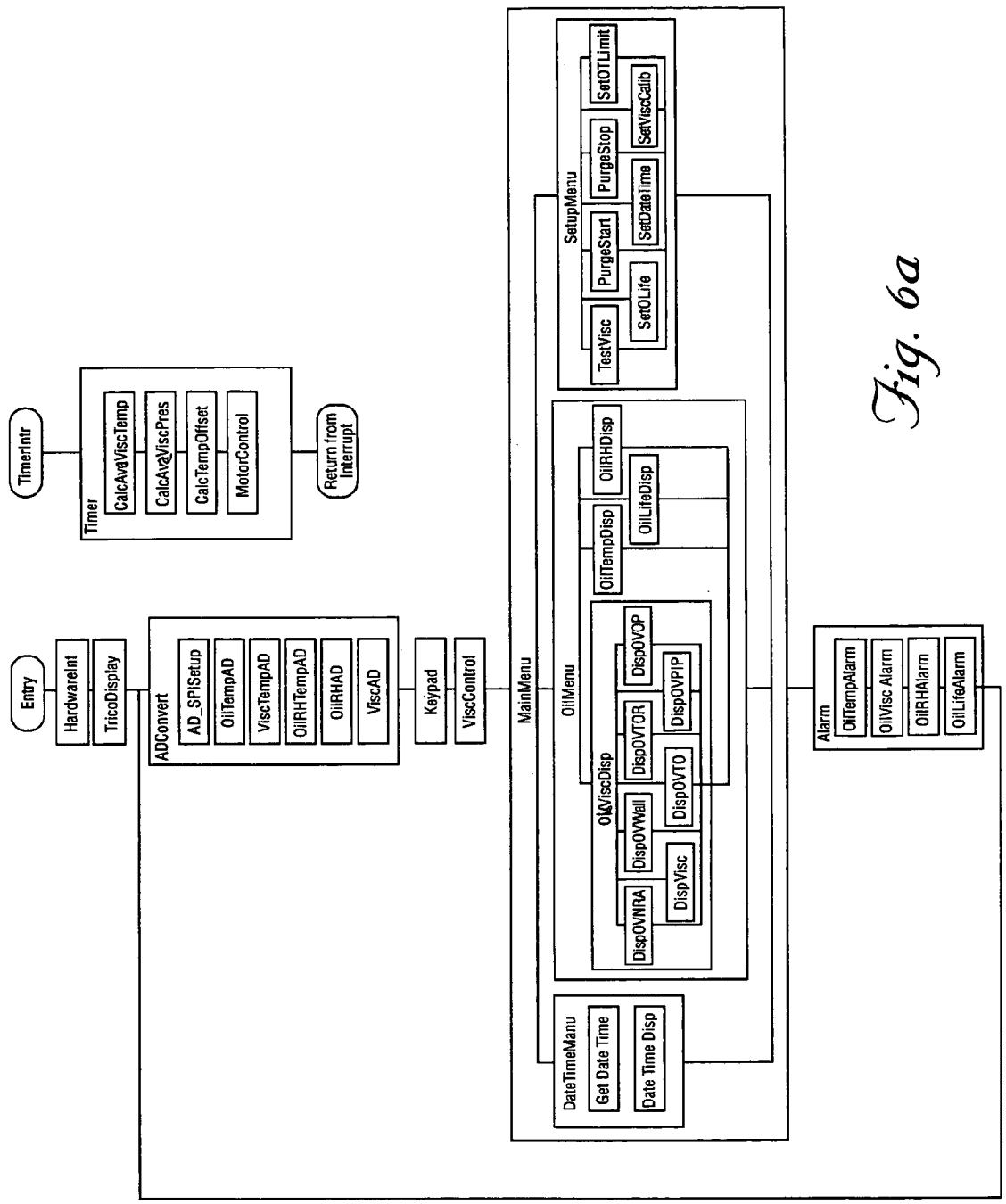
FIG. 6A is a programming flow chart for operation of the software used in combination with the present commercially preferred embodiment of the invention disclosed herein.

The software is divided into two sections, a Background-Loop section, which is initiated at power-up and then continuously loops performing tasks that are not time dependent, and a Timer-Interrupt section, which is entered every 5 milliseconds (ms). Both of these sections are illustrated in FIG. 6A.

The background section of the software is entered at power-up. It calls for execution of two subroutines that are executed only once and are not part of the loop software, which executes its functions until the processor is powered down.

HardwareInit-Initializes HC05 internal registers which control the HC05 timer subsystem and the port I/O lines. Further, it also activates the Timer/Subsystem interrupt and sets up the Timerinter vector.

A message display may be used at this point to display a predetermined message, such as an advertisement or other predetermined information, for a predetermined period of time prior to displaying the Time-Oil-Setup menu.

The loop section software comprises several elements.

The first element is the ADConvert, which is communicatively coupled to an MC145041 A/D converter through an HC05 SPI interface. The MC145041 has 11 input channels. In the presently preferred commercial embodiment only five (5) are used but more or less channels could be used depending upon the features and/or functions desired. The MC145041 sequentially calls the following series of subroutines, which then retrieve data from different A/D channels:

AD SPISetup—Initializes the MC145041.

OilTempAD—Reads the channel connected to the thermocouple circuit reading sump oil temperature.

ViscTempAD—Reads the channel connected to the thermocouple circuit reading oil temperature inside the viscometer rail.

OilRHTempAD—Reads the channel connected to the thermocouple circuit reading the temperature of the air next to the relative humidity sensor. This temperature is used to adjust the relative humidity reading for temperature.

OilRHAD—Reads the channel connected to the relative humidity circuit.

ViscAD—Reads the channel connected to the relative humidity circuit.

The second element is the Keypad which checks to see if any key is closed using the standard "activate-row-read-column" polling technique.

The third element is the ViscControl which checks to see if it is time to actuate the automatic viscometer run if the predetermined time, presently high noon, is reached.

The fourth element is the main menu feature that determines which of the three operator interface routines will be called. The "time", "Oil", and "Setup" keys on the keypad are used to select one of the three subroutines; and it will be apparent to a person of skill in the art after reading this disclosure that the number of subroutines used may be increased or decreased depending upon the number and type of functions desired.

The first subroutine is the date-time-menu subroutine. This subroutine is for displaying the current time and will call the following two subroutines in sequence.

Get-Date-Time which reads the current time and date from a Dallas DS1305 clock chip.

Date-Time-Disp, which displays the current date and time on the Liquid Crystal Display (LCD).

The second subroutine is the OilMenu subroutine that displays the monitored oil or lubricant readings. The "next item" key on the Keypad is used to sequence through the four (4) displays (i.e. Viscosity/Temperature/Oil-life/Humidity).

The OilViscDisp is the viscosity display and normally displays the current viscosity reading (i.e. the reading from the most recent test or monitoring).

However, other displays or messages may also be displayed depending upon the state of the mechanism.

DispOVNRA displays the "no reading available" message.
DispOVWait displays the "Wait for 2 min" message.
DispOVTOR displays the "Oil Purged" message.
DispOVTO displays the "Timeout" message.
DispOVPIP displays the "Purge in Progress" message.
DispVisc displays the current viscosity value.

The OilTempDisp is the temperature display and normally displays the sump oil temperature.

The OilLifeDisp is the oil life display and displays the number of days remaining before the next scheduled oil change.

The OilRHDisp is the relative humidity display and normally displays the relative humidity of the oil.

The third subroutine is the SetupMenu subroutine for displaying the seven-(7) operator entry possibilities. The "next item" key on the Keypad is used to sequence through the seven (7) possibilities which are:

TestVisc—Pressing the "Enter" key of the Keypad at this item will initiate a
Viscometer-Test. Normally the Viscometer-Test is only initiated once a day by the ViscControl subroutine.
PurgeStart—Pressing the "Enter" key of the Keypad at this item will initiate or start the rail pump and cause the display to sequence to PurgeStop. The pump will continue to run using "full-strokes" up to two minutes unless the "Enter" key is pressed again.
PurgeStop-Pressing the "Enter" key will stop the rail pump and cause the display to sequence back to the PurgeStart condition.
SetOilLife—The current Oil life setting is displayed along with a blinking cursor. The left/right arrow keys of the Keypad can be used to position the cursor and the up/down arrow keys to change the numeric values. After all digits are at their desired values, pressing the "Enter" key will store these values into non-volatile memory in the DS1305 clock chip. The "Next Item" key will sequence to the next setup menu item without saving any changes that might have been made.
SetDateTime—Same as SetOiLife for setting date and time.
SetOTLimit—Same as SetOillife but for changing the sump oil temperature limit. This limit determines when the alarm condition will occur.
SetViscCalib—Same as SetOiLife, but for changing the viscometer calibration value this value should be set only once before the unit is shipped out. The value adjusts for mechanical and electric component variation between units by adding or subtracting the calibration value. This value must be determined by the look-up table (Calib_Value_Table.xls), which attached hereto as Appendix B and is incorporated by reference into this disclosure. The values in the look-up table are set empirically by making a baseline measurement as discussed supra and shown in FIG. 7.

The fifth element is the Alarm feature. The alarm feature is for displaying alarm conditions on the Red/Yellow/Green Light Emitting Diodes (LED's). The alarm feature will also cause the offending or out of range conditions value to be blinkingly displayed. If the alarm feature is actuated the following four (4) subroutines are called in sequence. If more than one condition is causing an alarm then the last condition checked in the sequence will have its value displayed.

The first subroutine is the OilTempAlarm, which uses the Oil Temperature Limit entered in the SetOTLimit to determine which LED to illuminate. When the temperature raises to within 110° F. of the Limit, the Yellow LED is lit and when it is greater than the Limit, the Red LED is illuminated.

OilViscAlarm—Uses the last Oil viscosity reading to determine which LED to light. Viscosity variations or deviations of 10%–15% cause the Yellow LED to be lit and greater than 15%, the Red LED.

OilRHAlarm uses the last relative humidity reading to determine which LED to light. Relative humidity of 70%–80% causes the Yellow LED to be lit and greater than 80%, the Red LED is illuminated.

OilLifeAlarm feature is currently reserved for future use.

The Timer-Interrupt Section contains the software that performs the Viscometer-Test. It also maintains a few counter/timer variables used by some of the Background subroutines, e.g., the variable used to blink the display when there is an alarm condition, but these only amount to a few lines of code and may be referenced in Appendix A.

The first element of this section of the code is the Timerintr subroutine that calls the Timer function and upon return sets the TCR OCIE bit.

The second element is the Timer, which clears the Output-Compare-Flag in the HC05's register and calls the TimerOC subroutine, which is described below, in the drawings, and in Appendix A.

The third element is the TimerOC subroutine. This subroutine is entered each time the HC05 internal free running timer is equal to a 16 bit Output-Compare-Register (OCR). Our software has been set up so that each time this happens, the TCMP output line toggles. The TCMP line is connected or coupled directly to the STEP input of the stepper-motor-driver chip (UCN5804) and therefore controls the speed of the motor. The step rate is determined by what value is added to the current OCR value because that will be the length of time that has to elapse before the free running timer again equals the OCR and again causes the TCMP line to toggle and cause the next step to the stepper motor.

Currently only a single stepper motor speed is being used but more speeds could be added. The present stepper motor speed is 180 steps per second. This means that approximately every 90 ms (approximately 11 to 12 times each second) the oil pressure value inside the rail is checked to see if a compression stroke has been started. If yes then a counter is incremented which activates pressure averaging after the pressure has been stabilized. A second counter is started that counts pressure pulses. The pressure is averaged across eight (8) pulses and also within each pulse, until eight pulses which meet predetermined conditions indicating that they are "good" pulses have been accumulated or until a two minute timeout occurs. The first pulse is not included in the average and a pulse is considered "good" when its pressure value is close to the value of the previous pulse. After eight good pulses the GetOVRatio subroutine is called to calculate the line viscosity deviation.

Additional timer subroutines include:

CalcAveViscTemp—This subroutine is called each time TimerOC in entered. This averages 256 temperature readings of the oil inside the rail and stores that value for use by GetOVRarion and CalcTempOffset. It continuously averages the 256 sample readings of temperature data as read by ViscTempAD.

CalcAveViscPres—This subroutine is called after pressure has stabilized during a compression stroke of the monitored mechanism. Averages 64 pressure readings from ViscAD.

CalcTempOffset—This subroutine uses the average temperature value calculated by CalcAveViscTemp to calculate the offset into the temperature/pressure table. If the offset is not within the range of the table then a Temp-Out-of-Range condition is declared.

MotorControl—This subroutine controls the direction and length of stroke of the oil cylinder by controlling the direction and step counts of the stepper motor. This subroutine also reads the Proximity-Switch so the fully retracted cylinder position can be determined. Except during a viscometer reading, the cylinder is always driven to the fully retracted position and stopped.

Referring now to FIGS. 12–25 the exploded perspective views of the mechanical components of the commercially preferred embodiment of the present invention illustrating the mechanical structure and interrelationship of component parts may be seen. The details of the commercially preferred structure are similar to the same as those described in FIGS. 4 and 5. The differences from the alternative embodiments include the elimination of the pump 350 and the variable orifice 410. Other differences will be apparent to a person of ordinary skill in the art who reads this disclosure.

Figure 12:
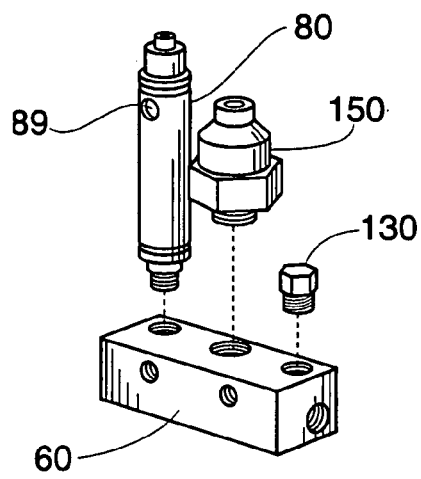
Figure 13:
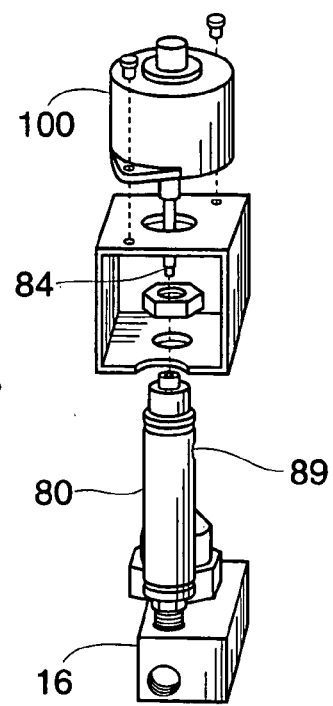
Figure 14:
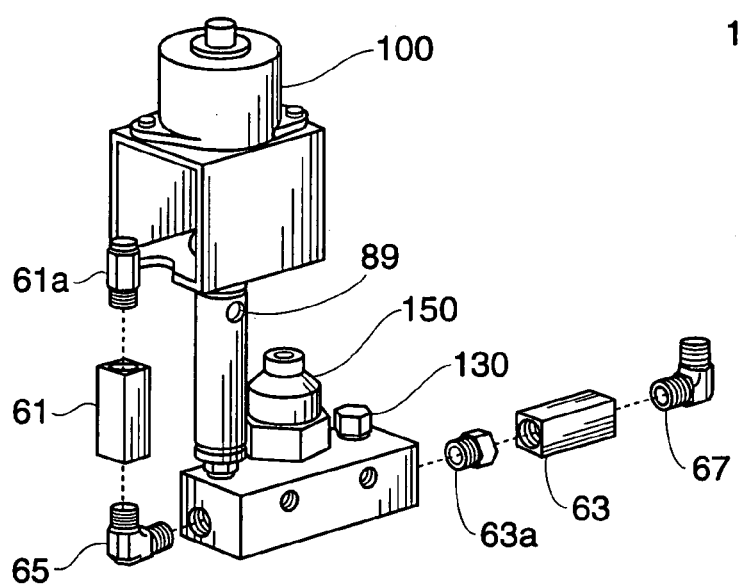
Figure 25:
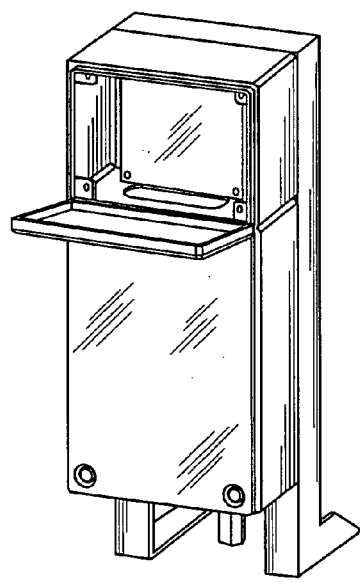

Starting with FIG. 12 and reading through to FIG. 25 the alternative commercial embodiment 16 of the present invention may be seen to generally comprise a device that is designed to be communicatively coupled to the machine or mechanism that is to be qualitatively monitored so that lubricant may be circulated through the commercial embodiment shown herein, its qualitative condition monitored, and an appropriate action be taken depending upon the information derived.

In the commercial alternative embodiment 16 the reservoir 60 is a manifold or rail 60 within which a predetermined amount of lubricant is drawn into and tested. A cylinder 80 is communicatively coupled to the rail 60. A pressure sensor 150 is communicatively coupled to the rail 60. A thermocouple 130 is communicatively coupled to the rail 60.

The cylinder 80 preferably but not necessarily includes an air hole 89 which is positioned behind the piston 82 (not shown in FIGS. 12–25). The air hole 89 allows for venting of air to the atmosphere during operation of the cylinder 80 so that no air is trapped in the cylinder 89 behind the piston 82 which could be subject to compression as the cylinder 80 operates and thereby present potentially false or inaccurate readings during operation of the alternative commercial embodiment.

The cylinder 89 includes piston shaft 84, which is mechanically coupled to stepper motor 100. The rail 60 further includes an elbow pipe 65 and fitting 63A that are communicatively coupled to the rail 60. Elbow pipe 65 is communicatively coupled to a check valve 61 to receive lubricant flow through it. Check valve 61 is further communicatively coupled to a fitting 61A. Fitting 63A is communicatively coupled to a check valve 63. Check valve 63 is communicatively coupled to an elbow pipe 67. Check valve 63 is positioned to allow lubricant from the rail 60 to flow through it into elbow pipe 67. Occurrence.

This portion of the commercial embodiment is mounted to plate 210 as illustrated in FIG. 15. Still referring to FIGS. 12–25 a transformer 230, preferably a 110 to 24 volt transformer, is mounted to plate 210 and electrically coupled to supply power to the unit 16 through circuit board 70. The electrical circuits used here have been previously described herein at FIGS. 9–11.

Figure 18:
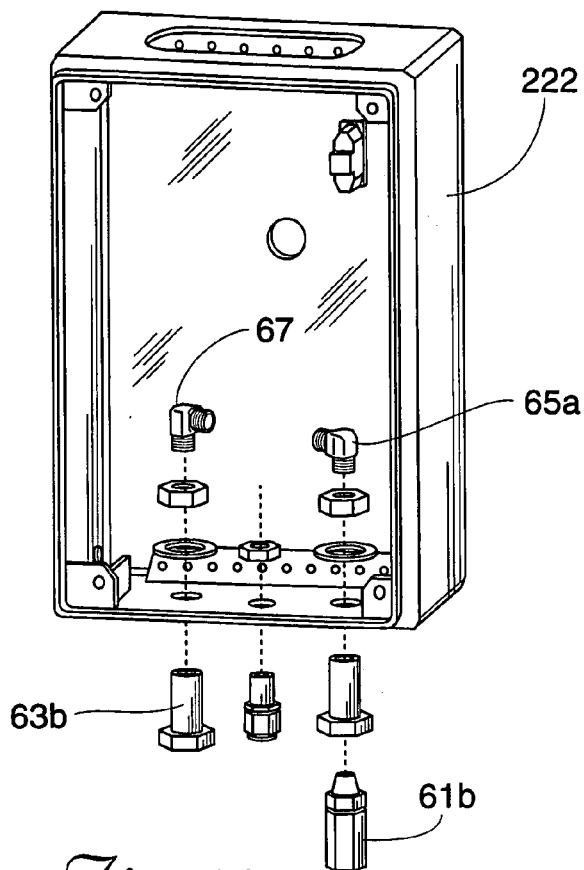
Figure 19:
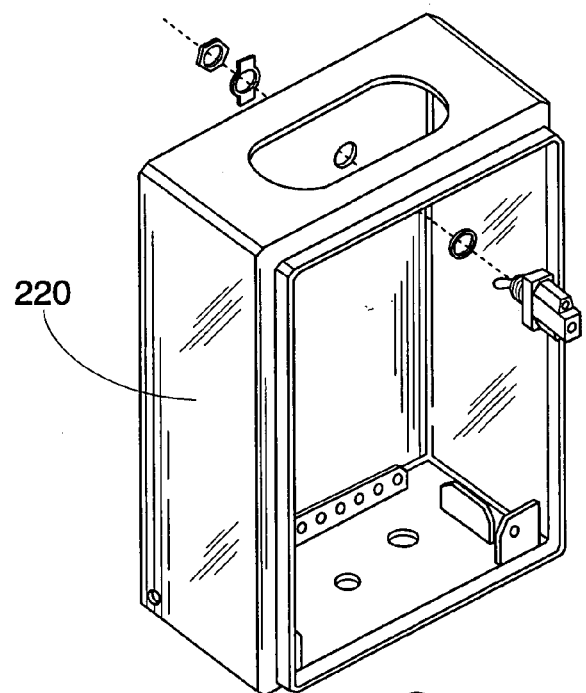
Figure 20:
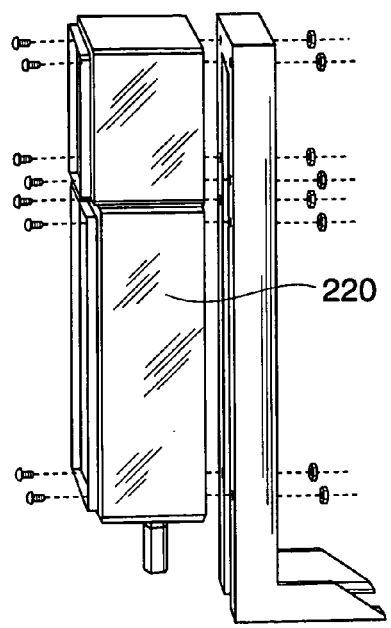
Figure 21:
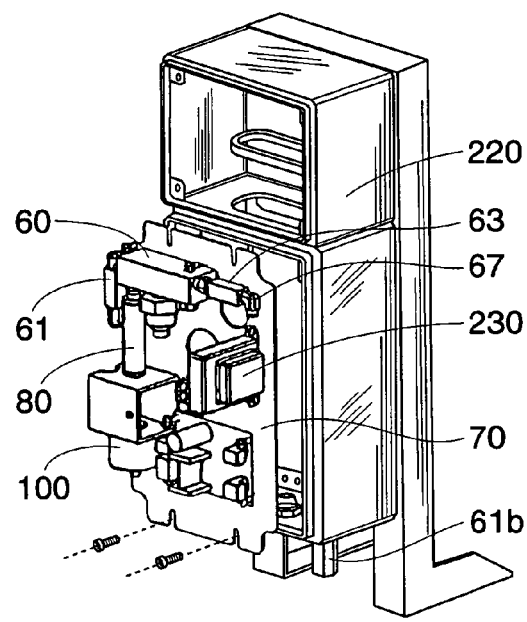
Figure 22:
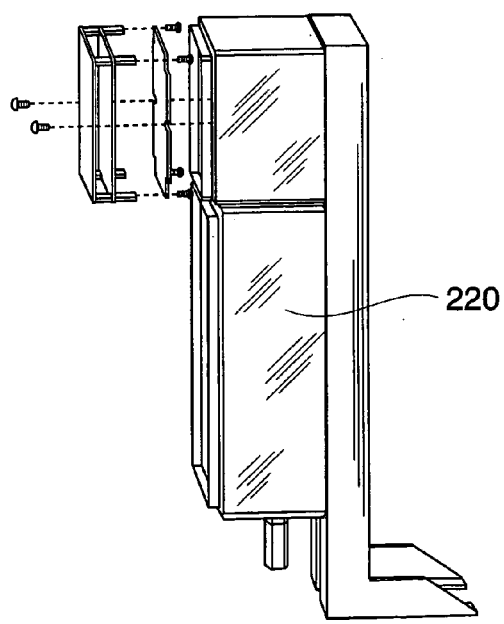
Figure 23:
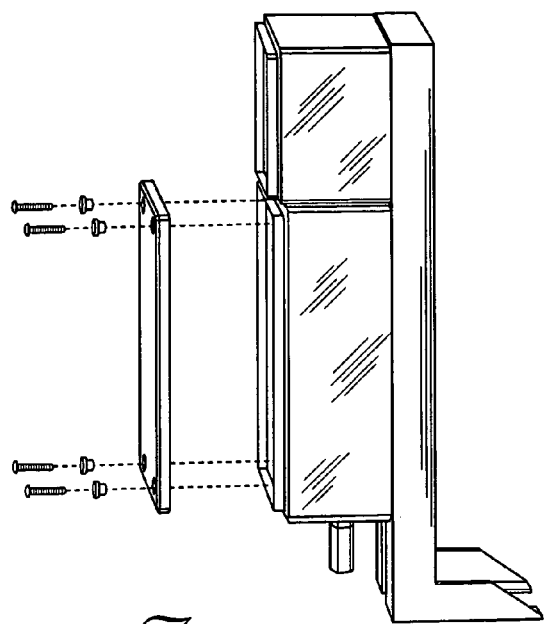
Figure 24:
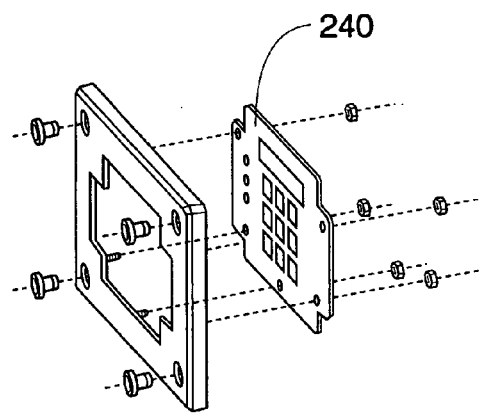

Referring now to box 222 starting at FIG. 18, a check valve 61B may be seen to be communicatively coupled to an elbow pipe 65A and a fitting 63B is communicatively coupled to an elbow pipe 67A. Lubricant will flow into the box through check valve 61B and elbow pipe 65A. Elbow pipe 65A is communicatively coupled to fitting 61A so that lubricant flows into the rail 60 as previously described. Elbow 67A is communicatively coupled to fitting 63B. Elbow 67A is further communicatively coupled to rail 60 through elbow pipe 67. Lubricant flows out of the rail 60 through aforesaid communicative arrangement of pipes and fittings.

Because the lubricant is transmitted through a series of one way check valves there is no need in the present invention for the addition of a pump structure as alternatively described herein. Actuation of the stepper motor 100 to retract the piston 82 will drawn lubricant into the mechanism 16. Likewise actuation of the stepper motor 100 to extend the piston 82 will pump lubricant out of the mechanism 16. Further, as will be apparent to a person of skill reading this disclosure no pump or motor and cylinder system would be necessary where there is a pressure differential between the lubricant entering the mechanism 16 and the lubricant exiting the mechanism 16.

Referring now to FIGS. 26 through 28 an alternative stand-alone version of the humidity sensor mechanism 200 is illustrated. In this system the signal process circuitry 320 is electrically coupled to a humidity sensor 200. The humidity sensor 200 is designed to attached to the mechanism to be monitored so that it is juxtaposed in the atmosphere above the lubricant material that is being monitored. Should a predetermined humidity condition occur a signal is sent from the sensor 200 to the signal process circuitry 320 which then illuminates either the green LED 202A and indicates a normal condition range or illuminates yellow LED 202B which indicates that the lubricant is nearing an unsafe or predetermined undesirable condition.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for qualitative lubricant condition control and monitoring, said apparatus comprising:
    a housing containing a mechanism desired to be lubricated;
    a lubricant contained within said housing;
    a lubricant condition sensing module coupled to said housing;
    said lubricant condition sensing module measuring a lubricant condition within said housing;
    said lubricant condition sensing module communicatively coupled to a qualitative control mechanism;
    said qualitative control mechanism communicatively coupled to at least one response mechanism;
    said qualitative control mechanism capable of actuating at least one said response mechanism;
    said lubricant condition sensing module capable of providing at least one signal to said qualitative control mechanism;
    said qualitative control mechanism being capable of interpreting said signal and actuating said response mechanism.

2. The apparatus of claim 1 wherein the lubricant condition sensing module senses at least one of temperature, pressure, vibration, viscosity, and power.

3. The apparatus of claim 1 wherein the lubricant condition sensing module senses water content.

4. The apparatus of claim 3 wherein the sensed water content is a percentage of saturation.

5. The apparatus of claim 1, the apparatus further comprising:
    at least one quantitative lubricant condition sensing module communicatively coupled to a quantitative control mechanism;
    said quantitative control mechanism communicatively coupled to at least one response mechanism;
    said quantitative control mechanism capable of actuating at least one said response mechanism;
    said quantitative lubricant condition sensing module capable of providing at least one signal to said quantitative control mechanism;
    said quantitative control mechanism being capable of interpreting said signal and actuating said response mechanism.

6. A lubricant sensing mechanism for sensing a physical lubricant condition of a lubricant, said lubricant sensing mechanism comprising:
    a housing containing a mechanism desired to be lubricated;
    a lubricant contained within said housing;
    a lubricant condition sensing module coupled to said housing;
    said lubricant condition sensing module measuring a lubricant condition within said housing;
    a signal mechanism for indicating at least one of a "high", "acceptable", or "low" predetermined lubricant condition
    said sensing mechanism programmed to communicate at least one actuating signal to said signal mechanism upon sensing said predetermined lubricant condition.

7. The apparatus of claim 6 wherein the physical lubricant condition senses at least one of temperature, pressure, vibration, viscosity, and power.

8. The apparatus of claim 6 wherein the physical lubricant condition senses water content.

9. The apparatus of claim 8 wherein the sensed water content is a percentage of saturation.

* * * * *

UNITED STATES PATENT AND TRADEMARK OFFICE
CERTIFICATE OF CORRECTION

PATENT NO. : 7,017,712 B1 Page 1 of 1
APPLICATION NO. : 09/457026
DATED : March 28, 2006
INVENTOR(S) : Brad Rake, Keith Cravillion and Mark Moertl It is certified that error appears in the above-identified patent and that said Letters Patent is hereby corrected as shown below:

On The Title Page Item (57) Abstract, line 13, after "element" insert -- is --

Column 16, line 23, after "condition" insert -- ; -- (semicolon)

Signed and Sealed this

Third Day of April, 2007

JON W. DUDAS
*Director of the United States Patent and Trademark Office*